US010958546B2

United States Patent
Jain et al.

(10) Patent No.: US 10,958,546 B2
(45) Date of Patent: Mar. 23, 2021

(54) SYSTEM AND METHOD FOR ESTIMATION OF QUALITY OF EXPERIENCE (QOE) FOR WEB BROWSING USING PASSIVE MEASUREMENTS

(71) Applicant: Hughes Network Systems, LLC, Germantown, MD (US)

(72) Inventors: Kaustubh Jain, Germantown, MD (US); Ramya Anusha Durvasula, Cambridge, MA (US); Chi-Jiun Su, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 235 days.

(21) Appl. No.: 16/253,558

(22) Filed: Jan. 22, 2019

(65) Prior Publication Data

US 2020/0213211 A1   Jul. 2, 2020

Related U.S. Application Data

(60) Provisional application No. 62/787,226, filed on Dec. 31, 2018.

(51) Int. Cl.
*H04L 12/26* (2006.01)
*H04L 29/08* (2006.01)

(52) U.S. Cl.
CPC .............. *H04L 43/08* (2013.01); *H04L 67/02* (2013.01)

(58) Field of Classification Search
CPC ........ H04L 43/08; H04L 67/02; H04L 67/322
See application file for complete search history.

(56) References Cited

U.S. PATENT DOCUMENTS

| 10,505,985 | B1 * | 12/2019 | Walter | H04L 63/0236 |
|---|---|---|---|---|
| 2013/0054791 | A1 * | 2/2013 | Oki | H04L 67/322 |
|  |  |  |  | 709/224 |
| 2013/0097313 | A1 * | 4/2013 | Zhang | H04L 67/02 |
|  |  |  |  | 709/224 |
| 2017/0085617 | A1 |  3/2017 | Bovik |  |
| 2017/0237777 | A1 * | 8/2017 | Joch | H04L 63/062 |
|  |  |  |  | 713/152 |
| 2020/0177485 | A1 * | 6/2020 | Shurtleff | H04L 43/0876 |
| 2020/0213211 | A1 * | 7/2020 | Jain | H04L 43/08 |

OTHER PUBLICATIONS

International Search Report and Written Opinion dated Mar. 20, 2020 by the International Searching Authority (European Patent Office) in PCT Application PCT/US2019/068896.

* cited by examiner

*Primary Examiner* — Nicholas R Taylor
*Assistant Examiner* — Tania M Pena-Santana
(74) *Attorney, Agent, or Firm* — NovoTechIP International PLLC

(57) ABSTRACT

Systems and methods are disclosed, and one includes a computer-implemented method for predicting quality of experience (QoE) for application downloading a webpage from a server stack, including determining a stat data corresponding to a traffic through a network node, generating a feature vector using the stat data, estimating a download performance metric for the application in a downloading of the webpage, using feature vector data, and estimating a QoE value, using the estimated performance metric.

19 Claims, 14 Drawing Sheets

SYSTEM AND METHOD FOR ESTIMATION OF QUALITY OF EXPERIENCE (QOE) FOR WEB BROWSING USING PASSIVE MEASUREMENTS

CROSS REFERENCE TO RELATED APPLICATION

This application claims the benefit of priority from U.S. Provisional Patent Application Ser. No. 62/787,226, filed Dec. 31, 2018, and entitled "SYSTEM AND METHOD FOR ESTIMATION OF QUALITY OF EXPERIENCE (QoE) FOR WEB BROWSING USING PASSIVE MEASUREMENTS," which is incorporated by reference herein in its entirety.

BACKGROUND

When an Internet user clicks on a webpage, the time required for the webpage to load on the user's device can weigh significantly in the user's rating of the experience. Therefore, entities such as Internet Service Providers (ISPs) can desire accurate estimation of the webpage load time. Various techniques for such estimation are known, but all have shortcomings. For example, one technique is to indirectly estimate webpage load time using readily obtainable health metrics of the network. However, page load times can be unacceptable regardless of such metrics being within an acceptable range. For example, long webpage load time can be due to client device problems.

Another technique for estimating webpage load times is to count user complaints. This technique, however, has shortcomings. One can be a time lag between network conditions causing poor page load times and receiving user complaints. Another can be negative bias due to users tending to not report "good" webpage load experience.

Another technique is to directly measure webpage load times, by installing a webpage load time measurement application on the user's Internet access device. However, the measurement application may be perceived by users as encroachment upon privacy, and as being susceptible to misuse.

Another technique is installation of a Java script on the webpage. For example, Java script can be inserted at the start of the webpage request to monitor the subsequent HyperText Transfer Protocol (HTTP) requests for webpage. Once all the objects on the webpage have finished loading, the Java script can determine the webpage load time. However, for websites using HTTP Secure (HTTPS), object requests are generally encrypted (e.g., by Transport Layer Security (TLS)) and it may be not possible to see encrypted requests except at the user's web browser or at the webpage content servers.

Another technique is via active tests. However, such tests cannot operate continuously and, when operating, can introduce additional network traffic.

SUMMARY

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

Among examples of disclosed methods are computer-implemented methods for predicting quality of experience (QoE) performance of an application downloading a webpage over a network, and computer implementations can include a determining of stat data corresponding to a traffic through a network node of a network path between the application and a server stack, and generating a feature vector, based at least in part on at least a portion of the stat data. Computer-implemented methods can also include estimating a download performance metric for the application, in its downloading the webpage from one or more servers in the server stack, based at least in part on at least a portion of the feature vector, and can include estimating a QoE value, based at least in part on the estimated performance metric.

Among examples of disclosed system are implementations that include a processor, coupled to a node of an access path between a wide area network (WAN) and an external interface, which can be configured to interface with a webpage access device. Implementations can also include a memory device, coupled to the processor, the memory device storing processor-executable instructions that, when executed by the processor, cause the processor to: detect transport-layer connections extending through the node. The detection can be configured such that the detected connections can possess have at least a likelihood of association with a downloading, by a webpage access application associated with the webpage access device, of a webpage hosted by a server stack. The processor-executable instructions, in addition, can include instructions that, in response to detecting connections, can generate connection-level stat data. The instructions can be configured to cause the processor to generate the connection-level stat data to indicate, for each of the connections, a connection start time, a connection end time, a network address for a respective server in the server stack, and a network address for the webpage access application. The processor-executable instructions can also include instructions that, when executed by the processor cause the processor to in generate a feature vector, based at least in part on at least a portion of the connection-level stat data, estimate a download performance metric for the webpage access application downloading the webpage from the server stack, based at least in part on at least a portion of the feature vector; and estimate a QoE value, based at least in part on the estimated performance metric.

Also among disclosed method can be another computer-implemented method for predicting QoE performance of a webpage access application downloading a webpage over a network. Features can include detecting transport-layer connections extending through a node, the connections having at least a likelihood of association with a downloading, by the webpage access application of the webpage, a server stack and, in response, generating connection-level stat data that indicates, for each of the connections, a connection start time, a connection end time, a network address for a respective server in the server stack, and a network address for the webpage access application; generating a feature vector, based at least in part on at least a portion of the connection-level stat data; estimating a download performance metric for the webpage access application downloading the webpage from the server stack, based at least in part on at least a portion of the feature vector; and estimating a QoE value, based at least in part on the estimated performance metric.

BRIEF DESCRIPTION OF THE DRAWINGS

The drawings and figures depict various implementations in accordance with the present teachings, by way of example only, not by way of limitation. In the figures, like reference numerals refer to the same or similar elements. For purposes of convenience the drawings are not necessarily made to scale.

DETAILED DESCRIPTION

Figure 1:
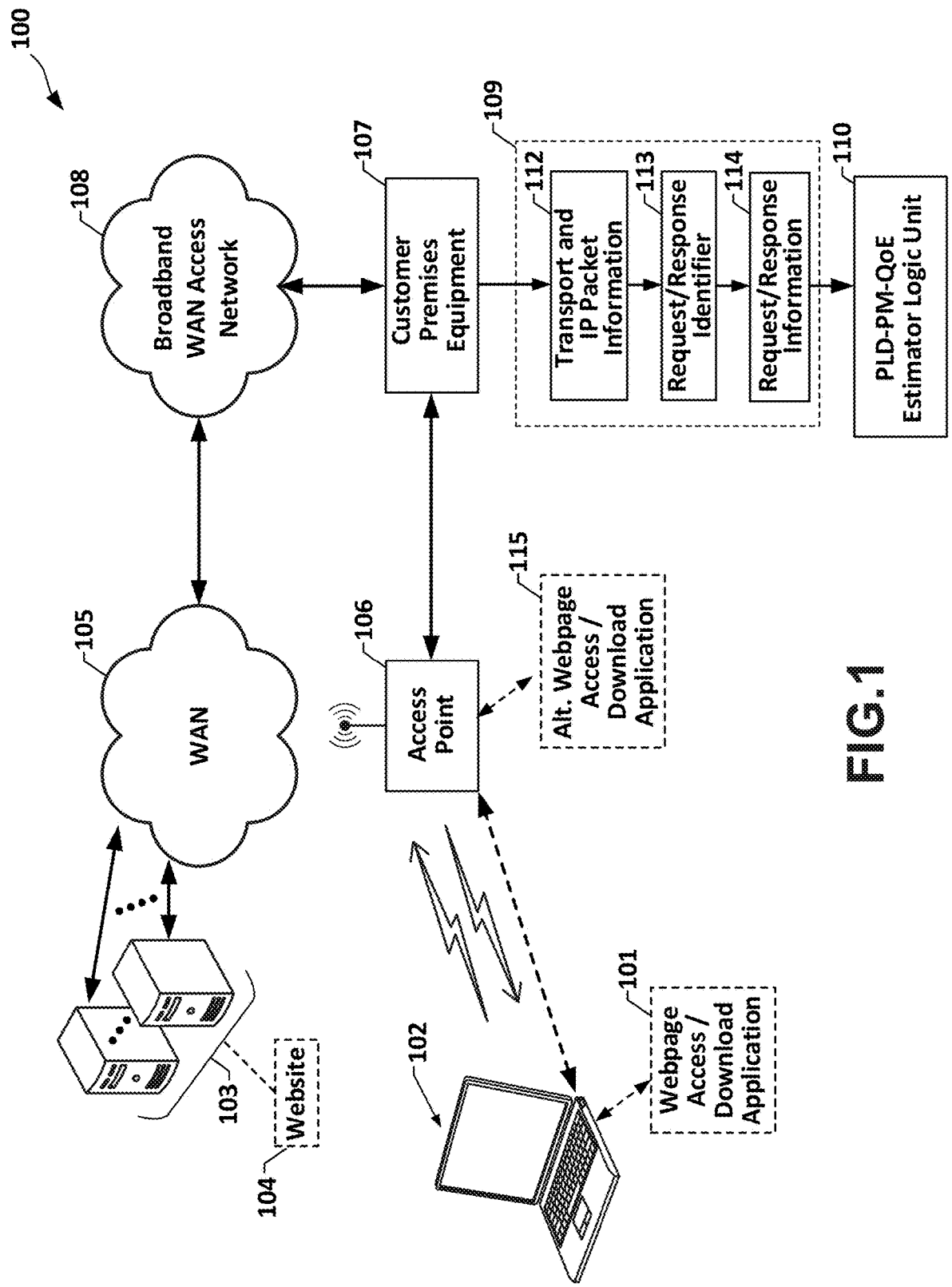
FIG. 1 is a functional block diagram of an implementation of an example network according to this disclosure, supporting webpage downloading (hereinafter "PDL") traffic, and with passive measurement and estimation of various PDL-related stats, and estimation of PDL performance metrics (hereinafter "PDL-PM") and of QoE.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

The term "server," as used herein, means a logic resource or aggregation of resources providing functionalities that include, but are not limited to, functionalities by which a resource meets the ordinary and customary meaning of "server."

The term "plurality of servers" as used herein can encompass, without limitation, any population of two or more Internet servers, without limitation as to geographic location or distribution, without limitation as ownership or control; and can encompass any population of two or more virtual servers hosted on or by any processing resource, irrespective of hardware configuration or architecture.

The term "server stack" as used herein encompasses, without limitation, any among, and any combination or sub combination of, a server; a plurality of servers; a server resource; a virtual server; and a cloud server.

The term "multi-configurable," as used herein, encompasses, without limitation, configurations that are selected and fixed at time of design; configurations that are selected and fixed at time of, or prior to completion of manufacture; configurations that remain changeable or selectable after completion of manufacture, and can be selected and fixed at time of installation; configurations that remain changeable or selectable after completion of installation, including re-configuration that is any of periodic, aperiodic, automatic, user-selectable, and/or via service intervention.

Description of various concepts, features, aspects, and operations thereof includes references to Transport Control Protocol/Internet Protocol (TCP/IP). Such reference is for purposes of example and is not intended as a limitation, as contemplated practices according to disclosed concepts and aspects thereof can include use with other protocols, either current or future, that support a client application accessing and downloading webpage content, for object-based webpages and non-object-based webpages.

Implementations of systems and methods according to this disclosure can provide, among other features and benefits, estimation of QoE performance of a webpage access/download application, for example, running on a user equipment (hereinafter "UE") in accessing and downloading webpages over the Internet or other wide-area network (hereinafter "WAN"). Implementations can interface with, and operate transparent to the UE webpage access/download application, and transparent to conventional resources through which the UE can access the Internet. Example implementations can interface and passively monitor traffic through a customer premises equipment (hereinafter "CPE") of an ISP, e.g., a digital modem connected to a "last mile" optical fiber of the ISP, or to a Very Small Aperture Terminal (VSAT) communicating with the ISP by forward and reverse satellite link. Implementations can include a passive traffic monitoring resource that can be connected or coupled to a network node within a network path between the UE and webpage access/download application and what can be a plurality of servers hosting webpage content. Examples of such network nodes can include, but are not limited to, the above-described CPE. The traffic monitoring resource can be configured to generate stat data to include transport layer stat data and application layer stat data.

In an aspect, the transport-layer stat data can be connection-level stat data, indicating connections being established and ending, over a duration that can include, for example, a particular portion of the downloading, or can include the entire webpage download. The connection-level stat data can indicate various features of the connections, for example, connection start times, connection stop times, network addresses of the servers at the connection endpoints, and other information, as will be described in greater later in this disclosure.

The traffic monitoring resource can be configured to generate the application stat data as object-level stat data, in accordance with protocols such as HTML that can code webpages as webpage objects, (hereinafter "objects"). The object-level stat data can indicate, or can indicate an approximation of, stats for each of a plurality of objects the webpage access/download application downloads. Disclosed systems and methods can apply particular arranging and combining processes to such object-level stat data, or to approximations thereof, or to both, and to connection-level stat data. Systems and methods can then feed the particularly arranged and combined object-level stat data and connection-level stat data to estimation models to estimate starts and ends of webpage downloads, as described in greater detail later.

Object-level stat data generated by the traffic monitoring resource can include, but is not limited to, size (e.g., in bytes) of the objects, a time at which the webpage access/download application requested the object. Regarding approximation, "in an implementation, the traffic monitoring resource can be configured to estimate the object sizes, and other object-level stat data. The estimation can be based, at least in part on the transport later stat data, or on other monitored data. Implementations of the traffic monitoring resource can be configured to combine the connection level data with the object-level data, or their respective informational content, to form the stat data to include, or be logically arranged as a plurality request-response pairs—one pair for each webpage object. The request-response pairs can include, for example, identifiers for the objects and, for each, a size (or approximate size) of the object, a time the webpage access/download application requested the object, a time the server responded with the first packet of the object, and other information. Systems and methods can be configured to store connection and request-response stats in a buffer, over a time horizon. Systems and methods can also be configured to increment a time window along at least a portion of the time horizon and, at each time increment, estimate whether webpage load activity exists within the time spanned by the time window.

In an implementation, the estimation can include providing the stat data within the time window to an estimator model, or estimator models. The estimator model(s) can be configured to apply look-ahead, or look-back, or both look-ahead and look-back, over the time window to estimate whether the time window spans part of webpage download. Specific implementations of estimator model(s) can include, but are not limited, stat based estimator models, rule-based estimator models, machine-learning (ML) estimation models. Estimator models can include single-stage estimator models and multiple-stage estimator models. Implementations can include a post-processing logic that, based at least in part on a succession of outputs from the estimator, can generate estimates of when a webpage load starts and when a webpage load ends and, accordingly, estimate the webpage load duration. Implementations can further include estimation of QoE, based at least in part, on estimated PLT.

FIG. 1 is a functional block diagram of an implementation of an example network system 100 (hereinafter "system 100") according to this disclosure, supporting webpage downloading (PDL) traffic between a webpage access/download application 101 running on a UE 102, and one or more web servers, collectively represented as a server stack 103, hosting a webpage 104.

FIG. 1 illustrates the UE 102 as a laptop computer, but this is only an example. It is not a limitation. Other devices that can function as the UE 102 can include, without limitation, smart phones, tablet computers, desktop computers, notebook computers, game consoles, various multimedia devices, smart wrist watches, and Internet of Things (IoT) devices. The webpage access/download application 101 can be implemented, without limitation, as a web browser.

The server stack 103 can interface a WAN 105 such as, for example, the Internet. The webpage access/download application 101 can access the WAN 105, for example, via an access point 106, e.g., Wi-Fi connected to the CPE 107, for example via a broadband WAN access network 108 that can connect to the WAN 105. In implementations where the Internet serves as the WAN 105 and can be the broadband WAN access network 108. Likewise, in such implementations an apparatus such as a digital modem connected, e.g., to an ISP "last mile" optical fiber or coax line can be the CPE 107, and an apparatus such as a Wi-Fi device can provide the access point 106.

In an implementation, the system 100 can include a multiple-level stat monitor 109 connected, for example to the CPE 107. The multiple-level stat monitor 109 can be configured to provide passive monitoring of traffic, e.g., packet transmissions, without direct functionality as to routing of the traffic. The multiple-level stat monitor 109 can feed the measured and estimated output to logic unit 110, which can be configured to perform webpage download (PDL) performance metric (PM) estimation and QoE estimation processes (hereinafter "PDL-PM/QoE estimation"), as described in greater detail later in this disclosure. The logic unit 110 can therefore be referred to as "PDL-PM/QoE estimation logic unit 110."

In an implementation, multiple-level stat monitor 109 can be configured to include a transport and IP packet information data block 112, request/response identifier data block 113, and request-response information data block 114. One example specific implementation of the multiple-level stat monitor 109 can be in accordance with U.S. patent application Ser. No. 15/344,684, titled "Application Characterization Using Transport Protocol Analysis," filed Nov. 7, 2016, (hereinafter "the '684 application") which is hereby incorporated by reference in its entirety. For example, the implementation, operations, and outputs of the FIG. 1 transport and IP packet information data block 112 can be provided by the '684 application item 420, which is visible in '684 FIG. 4, and is described by the '684 specification. Likewise, the implementation, operations, and outputs of the FIG. 1 request/response identifier data block 113 and request-response information data block can be provided by the '684 application items 430 and 440, respectively, both being visible in '684 FIG. 4, and described by the '684 specification.

As described in the '684 application, the multiple-level stat monitor 109 can apply, for example, "tcpdump," which is a Berkeley Software Distribution (BSD) packet analyzer for TCP/IP and other protocols; or "libpcap," which is a generally available packet capture tool; or Microsoft Message Analyzer, in combination with the '684 application "Algorithm 1," or "Algorithm 2," or both algorithms, and generate outputs that identify beginnings and endings of request/response periods during a TCP connection, and generate request/response information for the identified request/response periods.

Functionality of the multiple-level stat monitor 109 and/ or forward monitored though much of the types of transport protocol state information discussed above may be collected based on transport protocol header values, the monitor 109 generally will not have access to internal state information maintained by an endpoint of a transport protocol connection stat logic 109 connected, in the FIG. 1 example, to the CPE 107.

Referring to FIG. 1, assuming for purposes of description TCP/IP protocol, certain example operations will be described. Description assumes a webpage 104 made up of one or more web objects. The webpage 104 can be downloaded using several TCP connections over which the objects are requested. Some of the objects can be hosted (hence requested) from different web servers (different domain names and destination IP addresses) In each TCP connection, one or more HTTP requests are issued by a browser to a web server to request web objects and the server responds with a HTTP response which include the web objects. A HTTP request and a HTTP response is, in turn, composed of one or more TCP/IP transmissions. In another aspect, the request can be, for example, User Datagram Protocol (UDP), or QUIC over UDP. The initiation can include the web browser 101 transmitting, to a URL of the webpage 104, a forward packet carrying an HTTP GET request specifying the resource. In a simple case, the webpage 104 in response can transmit one or more reverse packets, each comprising a portion of the requested resource. The transport protocol connection may be reused for additional such request/response exchanges.

The multiple-level stat monitor 109 can generate connection-level data (hereinafter "CLD"), for each transport-protocol connection, and can generate, for each HTTP(S) object detected as requested by the webpage access/download application 101, object-level data (hereinafter "OBD"). Example CLD can include, for a given connection, Server IP Address, Destination IP Address (where "Destination" can be the webpage access/download application 101) Server Port, and Destination Port, connection start time, connection end time, the number of objects in the connection, and the total number of bytes sent and received within the connection.

Example OBD can include HTTP(S) Request-Response sizes and timing information, and certain connection information, e.g., the above-described Server IP address, Destination IP address, Server Port, and Destination Port. In an aspect, subsequent processing, described in greater detail later in this disclosure, can use the OBD connection information to match the object with the connection. Example OBD information can also include an index of the object (hereinafter referred to, alternatively, as "Object Index") within the connection, time at which the object was requested, time when the response started, time when the response ended, request size in bytes, response size in bytes, number of packets in the request, and number of packets in the response.

The multiple-level stat monitor 109 can generate the above-described CLD and OBD for each of the transport protocol connections and website objects detected. Implementations can also apply further processing, described in greater detail later, that can derive input features from the CLD and OBD, and feed the input features to estimation processes for webpage load time (PLT) and other web-QoE metrics.

Alternatively, object-level statistics can be obtained using TLS record-layer information, instead of transport-layer information. One example implementation of obtaining object-level statistics using TLS record-layer information can be a process configured in accordance with U.S. patent application Ser. No. 14/986,551, titled "Maximizing Quality of Service for QoS Adaptive Video Streaming via Dynamic Application-Layer Throughput Rate Shaping," filed Dec. 31, 2015, (hereinafter "the '551 application") which is hereby incorporated by reference in its entirety. In other implementations, object-level stat date can be estimated. For example, the multiple-level stat monitor 109 can be configured to detect IP packet bursts communicated by a server to the webpage load application. The can detect bursts in different direction to approximate request and response sizes and their timing. This implementation can therefore operate, i.e., predict PDL-PM and QoE, non-TCP, e.g.: websites using QUIC/UDP.

Figure 2:
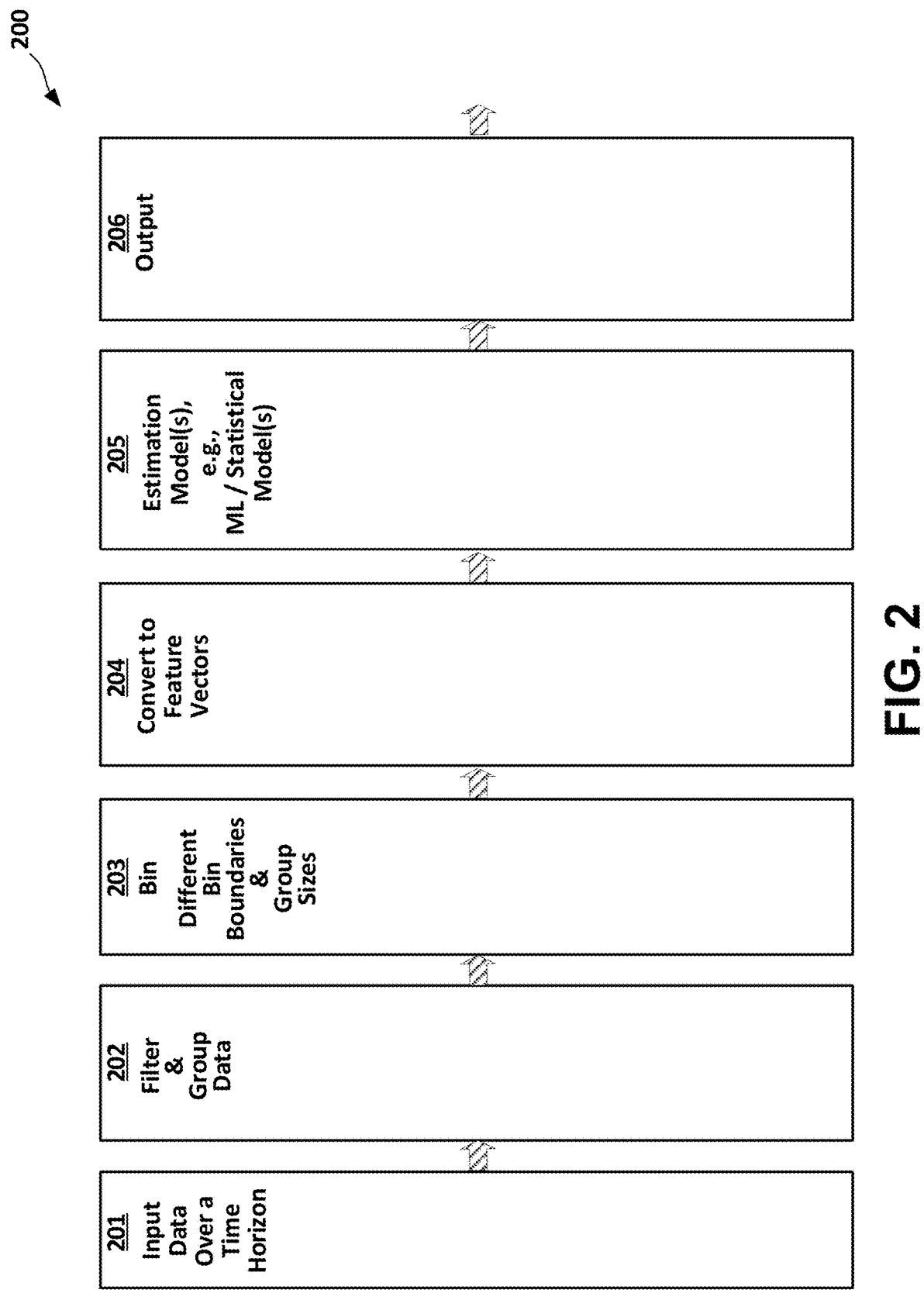
FIG. 2 is functional block diagram of an example PDL-PM/QoE estimation logic in accordance with disclosed concepts, which can implement various features and aspects of the PDL-PM estimation block and QoE estimation block of FIGS. 1 and 2.

FIG. 2 is a functional block diagram of an implementation of an example webpage download (PDL) performance metric (PM) and QoE estimation logic 200 (hereinafter "PDL-PM/QoE estimation logic 200"). The PDL-PM/QoE estimation logic 200 can implement, for example, the PDL-PM/QoE estimation logic unit 110 appearing in the FIG. 1 system 100. The PDL-PM/QoE estimation logic 200 can include data input logic 201, filter and group logic 202, binning logic 203, convert-to-feature-vector logic 204, a PDL-PM estimation logic 205, and post-processing logic 206. The data input logic 201 can be configured to receive, for example, from the FIG. 1 multiple-level stat monitor 109, a stream of CLD and OBD identifying, as described above, one or more transport protocol connections between the webpage access/download application 101 and the webpage 104 hosted by the server stack 103. The CLD and OBD can identify, for example, a Server IP Address (associated with a particular server of the server stack 103, Destination IP Address (associated with the webpage access/ download application 101), Server Port, and Destination Port, start and end times of the connection, the number of objects in the connection, and the total number of bytes sent and received within the connection. The object-level input data can include, for each object exchange (Request-Response), the above-identified connection information, an object index, and timing and size information for the requests and the responses. The timing and size information can include request-start time, response-start time, response-end time, request size in bytes, request packets, response size in bytes, and response size in packets.

The filter and grouping logic 202 can be configured to sort the object-level input data based, for example, on various ones of the timing information across the different connections. The sorting can form the object-level input data as time-sequenced sets of stats per object. One example of such sorting basis can be request-start times for the objects. Another example sorting basis can be, but is not limited to, response-end times.

Configuration of the binning logic 203 and convert-to-feature-vector logic 204 can depend in part on the implementation of the PDL-PM estimation logic 205. For example, according to various implementations, the PDL-PM estimation logic 205 can include one or more ML models. In other implementations, the PDL-PM estimation logic 202 can include stat-based models, or rule-based models, or both, as described in greater detail in later sections. The binning logic 203 and convert-to-feature-vector logic 204 can therefore be correspondingly configured to construct the feature vectors in accordance with the particular implementation of the PDL-PM estimation 205.

Assuming, for purposes of example, an implementation of the ML PDL-PM estimation logic 205. For various configurations of the ML model, or models forming the ML PDL-PM estimation logic 205, the filter and grouping logic 202 and the binning logic 203 can be configured to generate, from the object-level data, input features over a time window of a fixed number of seconds (e.g., several tens of seconds) and a fixed number of features per second, as input for each output (of one second). To provide the fixed number of features per second, objects requested by the webpage access/download application 101 within each second can be binned, by the binning logic 203. Then their stats per object, stats per interval, or counts per intervals can be used to generate the input features per second. One example configuration of stats per object is set forth in Table 1, described in greater detail later in this disclosure.

In one or more implementations, PDL-PM estimation logic 205 can be configured to output a logic 0-to-logic 1 that indicates starts and ends of webpage loads, and to generate the output for each input of a fixed time window (e.g.: tens of seconds) of CLD and OLD. The PDL-PM estimation logic 205 models according to this aspect can be termed "Start-End" models, and their operation referred to as "Start-End" estimation. In another one more implementations, the PDL-PM estimation logic 205 can be configured as a rule-based estimator, which can generate real-valued outputs, corresponding directly to a PDL-PM. In another aspect, PDL-PM estimation logic 205 models can be configured to output one binary logic level, e.g., logic 1, to indicate estimation of an on-going webpage load, and another binary logic level, e.g., logic 0, to indicate estimation of not being in a webpage load (or periods of relative inactivity or non-browsing traffic like bulk or streaming connection). PDL-PM estimation logic 205 models according to this aspect can be termed "Continuous" models, and their operation referred to as "Continuous" estimation.

As one non-limiting illustration of operations of a Continuous model implementation of the PDL-PM estimation logic 205, an assumed hypothetical output of this NN model, assuming 1-second time increments and no errors, could include a string of, for example, integer 30 1s, followed by a string of, for example, integer 10 0s, followed by a string of integer 20 1s. This hypothetical output would represent an estimation of 30-second webpage load, followed by a 20-second webpage. For purposes of description, ML models trained as such can be termed a "Continuous model," because the output (in the absence of error) can continue at logic 1 for the duration of a webpage load process. Various example implementations, and operations thereof are described in reference to the Continuous model. Such description is not intended as a preference, and persons of ordinary skill, upon reading this disclosure in its entirety, will be able to description referencing the Continuous model to implementations using the Start-End estimation.

Regarding the convert-to-feature-vector logic 204, implementations of PDL-PM estimation logic 205 can include NN model estimators, which are required to have a fixed number of inputs for each sample. Hence, from the object-level data, input features can be generated with a fixed number of seconds (time window of several tens of seconds) and fixed number of features per second, as input for each output (of one second). Once the data for each second has been created as described above, input feature vectors can be formed by the convert-to-feature-vector logic 204 by concatenating the features for N consecutive seconds. The ML PDL-PM estimation logic 205 can then assign labels of 0/1 (not webpage load/webpage load) based on the value of the middle second in each window. In other words, for each second that the ML PDL-PM estimation logic 205 predicts an output, the input data to its NN model can represent an N second window surrounding that second. The NN can be trained to generate its estimation output to correspond to the time at the middle, i.e., the N/2 position, of the window as a look-back of traffic activity over N/2 preceding seconds and look-ahead of traffic activity over N/2 succeeding seconds) for monitoring the traffic activity and combining up with a classification label for each second.

For purposes of illustration, assuming an example value of N=121 seconds, using look-back over the window from t=0 to t=59, and look-ahead over t=61 to t=120, the output label (logic 0 or logic 1) can be the webpage-load activity status for t=60, i.e., the $61^{st}$ second.

Other implementations can include look-back only, such that the output corresponds to the $N^{th}$ second, by looking at traffic from the window t=0 to t=WT. For example, referring to the above example N=121, a look-back output corresponding to the $121^{st}$ second (the end of each window) can be generated by looking at traffic from t=0 to t=120.

As identified above Table 1 sets forth one example configuration of stats per object that can be binned by the binning logic 203.

TABLE 1

| Features | Units | Bins |
|---|---|---|
| Object Number | | F1_B1, F1B2, . . . , F1BR |
| Time to First Byte (Response Start Time-Request Start Time) | msec | F2_B1, F2B2, . . . F2BS |
| Time to Download (Response End Time-Response Start Time) | msec | F3_B1, F3B2, . . . F3BT |
| Request Size | bytes | F4_B1, F4B2, . . . F4BU |
| Response Size | bytes | F5_B1, F5B2, . . . F5BV |
| #Request Packets | | F6_B1, . . . , F6BW |
| #Response Packets | | F7_B1, F7B2, . . . F7BX |

Referring to Table 1, an implementation of the binning logic 203 include integer BR bins for the object numbers, integer BS bins for time (milliseconds) to first byte, integer BT bins for time (milliseconds) to download, integer BU bins for request size (bytes), integer BV bins for response size (bytes), integer BW bins for number of request packets, and integer BX bins for number of response. It will be understood that "F1," "F2," "F3," "F4," "F5," "F6," and "F7," and "BR," "BS," "BT," "BU," "BV," "BW," and "BX," are arbitrary names applied for referencing within this disclosure, and have no intrinsic meaning.

For purposes of description, the object bins can be referenced, for example, as "object number first bin F1_B1," "object number second bin F1_B2," and so forth, through "object number $BR^{th}$ bin F1_BR." Time to first byte bins can be referenced for purposes of description, for example, as "time-to-first-byte first bin F2_B1," "time-to-first-byte second bin F2_B2," and so forth, through "time-to-first-byte $BS^{th}$ bin F2_BS." The other feature bins can be similarly referenced in accordance with the naming appearing in the lower 5 rows of Table 1.

It will be understood that binning as described in reference to Table 1 can provide the convert-to-features-vector logic 204 a number of features per unit time equal the integer sum of BR, BS, BT, BU, BV, BW, BX.

Table 2 shows one specific example of a binning in accordance with Table 1. It will be understood that the Table 2 number of bins for each feature, and respective boundaries for the bins, are examples and are not necessarily preferred values. As persons of ordinary skill will understand from reading this disclosure, particular bin quantities and boundaries can be design choice, and can be, at least in part, application-specific. Referring to Table 2, the example configuration includes integer 5 bins for object numbers, with example boundaries such as illustrated in Table 2, $1^{st}$ content row, $3^{rd}$ column. Bin configurations for the remaining 6 features can include, as visible in Table 2, integer 4 time-to-first-byte bins, integer 5 time-to-download bins, integer 4 request size bins, integer 6 response size bins, and integer 2 request packets bins, with the bin boundaries as visible in Table 2, third column, $2^{nd}$ through $7^{th}$ row.

TABLE 2

| Features | Units | Bins |
| --- | --- | --- |
| Object Number | | 0, 1, 2, 3, 4+ |
| Time to First Byte (Response Start Time-Request Start Time) | msec | 0-1000, 1000-2000, 2000-3000, 3000+ |
| Time to Download (Response End Time-Response Start Time) | msec | 0-10, 10-100, 100-1000, 1000-10000, 10000+ |
| Request Size | bytes | 0-140, 140-280, 280-420, 420+ |
| Response Size | bytes | 0-10, 10-100, 100-1000, 1000-10000, 10000-100000, 100000+ |
| #Request Packets | | 1, 2+ |
| #Response Packets | | 0-10, 10-100, 100+ |

An implementation of the binning logic 203 can be configured to provide the convert-to-feature-vector logic 204 with the Table 2 integer 29 features per unit time, i.e., the sum of the number of bins for all of the features. For convenience in description, this grouping can be referred to as a "frame." It will be understood that integer 29 features is only one example, and a different choice of time for each frame as well as different choices for the bins are possible. In an aspect, additional features can be added to each frame. Examples of added features can include, but are not limited to: number of transport protocol (e.g., TCP) connections started; number of distinct source ports; number of distinct destination IP addresses; maximum number of objects from a single destination IP address; and flag that indicates whether a next time interval, e.g., next second, next second has objects from new connections only. In one or more implementations, all 5 of these example additional features can be used, and added to the Table 2 example set of integer 29 features, thereby providing 34 features describing each frame.

The smoothing logic heuristic addressed above only looks at single time increment, e.g., one-second errors. In an implementation, the smoothing logic can be configured as a two-step smoothing logic. Techniques for applying ML to smooth output include, but are not limited to, a feed-forward neural network that takes localized data and returns a "corrected" output for each time point.

Figure 3:
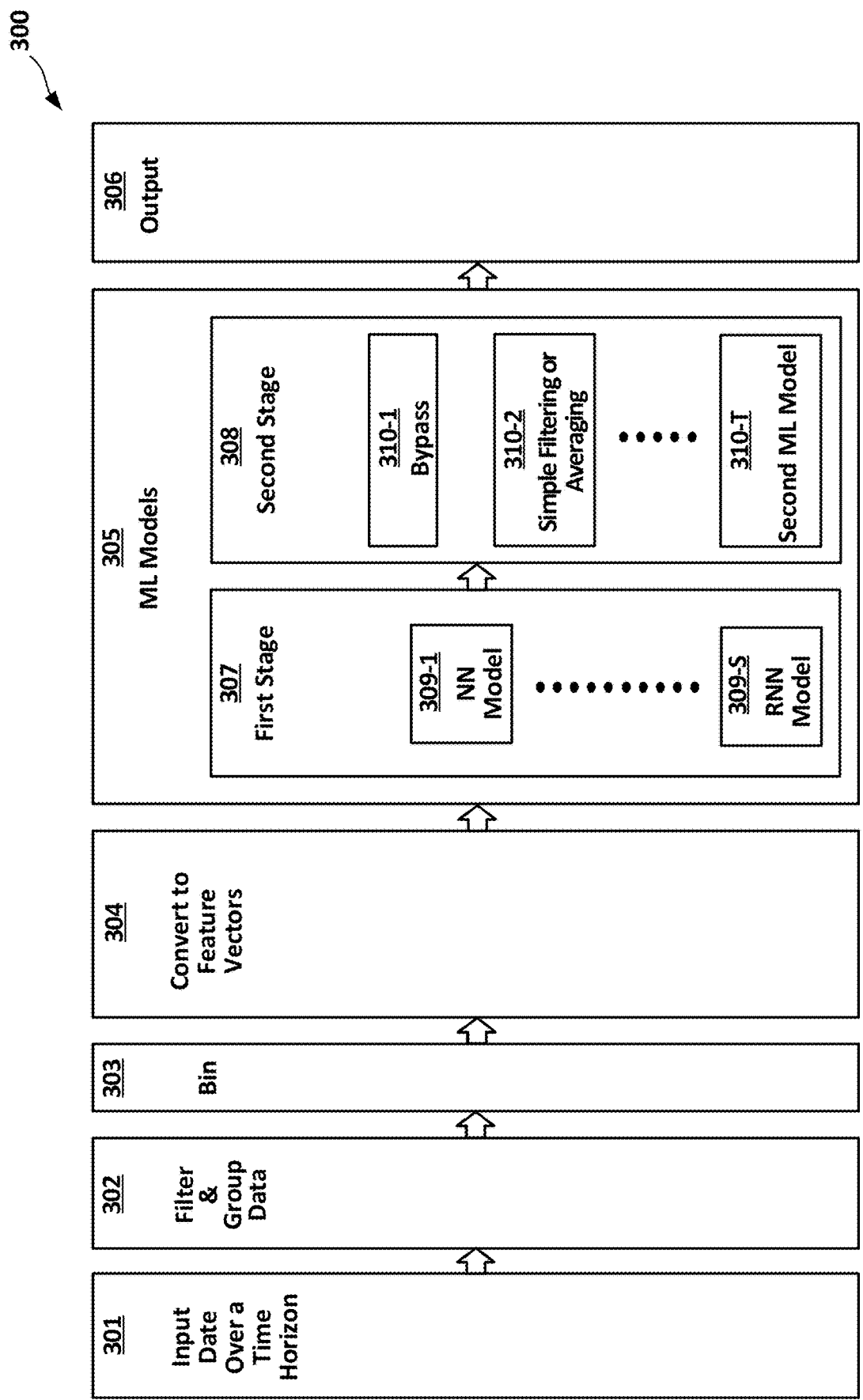
FIG. 3 is a functional block diagram of an example implementation of the FIG. 3 PDL-PM/QoE estimation logic, and including a two-stage estimation logic that can be configurable to provide machine learning (hereinafter "ML") model estimations, or statistical model estimations, or both, of PDL-PM and QoE, in accordance with disclosed concepts.

FIG. 3 is a functional block diagram of another implementation of another example PDL-PM/QoE estimation logic (hereinafter "PDL-PM/QoE estimation logic 300"), which can include a two-stage multi-configuration option ML PDL-PM estimation logic 305, as a specific implementation of the FIG. 2 estimation logic 205. The ML PDL-PM estimation logic 305 can be configured to provide for passive estimation of one or more PDL performance metrics, for example, in applications and combinations that may include features such as described above in reference to one or more of FIG. 1.

The FIG. 3 PDL-PM/QoE estimation logic 300 can include, an input logic 301, a filter and grouping logic 302, a binning logic 303, and convert-to-features-vector logic 304. Logic blocks 302, 303, and 304 can be configured in accordance with the configuration of the particular implementation of the two-stage re-configurable ML PDL-PM estimation logic 305. The two-stage re-configurable ML performance metric estimation logic 305 can include, as a first stage, a model raw estimation block 307, feeding a second stage, which can be configured as a selectable model smoothing block 308. In an aspect, the first stage, selectable model raw estimation block 307 can include, as the plurality of different raw estimation logic blocks, a set of integer S of such blocks. The integer S blocks can include, for example, as illustrated in FIG. 3, a neural network estimation logic 309-1, a recurrent neural network (RNN) estimation logic 309-S and, optionally, other blocks (not explicitly visible in FIG. 3. The second stage, selectable model smoothing block 308 can include integer T plurality of different raw estimation logic blocks, and illustrated examples include a neural network estimation logic 310-1, through an RNN estimation logic 310-T. The selectable model smoothing block 308 second stage of the two-stage re-configurable ML estimation logic 305 can include, for example, a bypass block 310-1 (meaning no smoothing), a simple filtering or averaging block 310-2, through to a second ML model logic 310-T and, optionally, other error-reduction blocks (not explicitly visible in FIG. 3).

In one non-limiting example configuration of the two-stage re-configurable ML PDL-PM estimation 305, the second stage 308 can be configured with an active implementation of the second ML model 310-T. In operation, an active implementation of one of the first stage NN models 309-1, . . . , 309-S can generate, as "raw" results," a string of 1s and 0s, with each string of 1s showing a likely webpage load. However, the string of 1s and 0s can include errors. One example error can be single-output (meaning single time increment) incorrect predictions. Such errors can, for example, result in falsely predicted short, e.g., single time increment, webpage loads when there is no true webpage load. Such error can likewise interrupt correct predictions during a longer webpage load, cause the load to falsely appear as downloads of multiple shorter webpages. In other words, prediction errors by the first stage NN models 309-1, ..., 309-S can result in underestimation of the durations of some webpage loads, and false prediction of various short webpage loads. These errors, and the resulting degradation in accuracy of PL performance metric estimation, can be significantly reduced by the above-described example implementation of the second stage 308, with its active second ML model 310-T. The reduction can be obtained, for example, by training the active second ML model 310-T to identify and correct the above-described prediction errors, or at least a statistically significant portion of such errors.

In another implementation, a Principal Component Analysis (PCA) (not explicitly visible in the figures) can be applied to reduce the number of input features. Referring to FIGS. 2-3, the PCA feature can be implemented as part of the binning logic 203 or, referring to FIG. 3, can be considered, together with the NN model 309-1, as an ML model 305. Similarly, instead of PCA, implementations can use auto-encoders (from NN family). In addition, for the regression family, implementations can use the binning algorithms and thresholds defined, for example, in reference to Table 2 for Continuous Model, to get 34 features per frame f, or to get 34 features per frame f/N, so that the model has 34*N features per input frame f.

Figure 4:
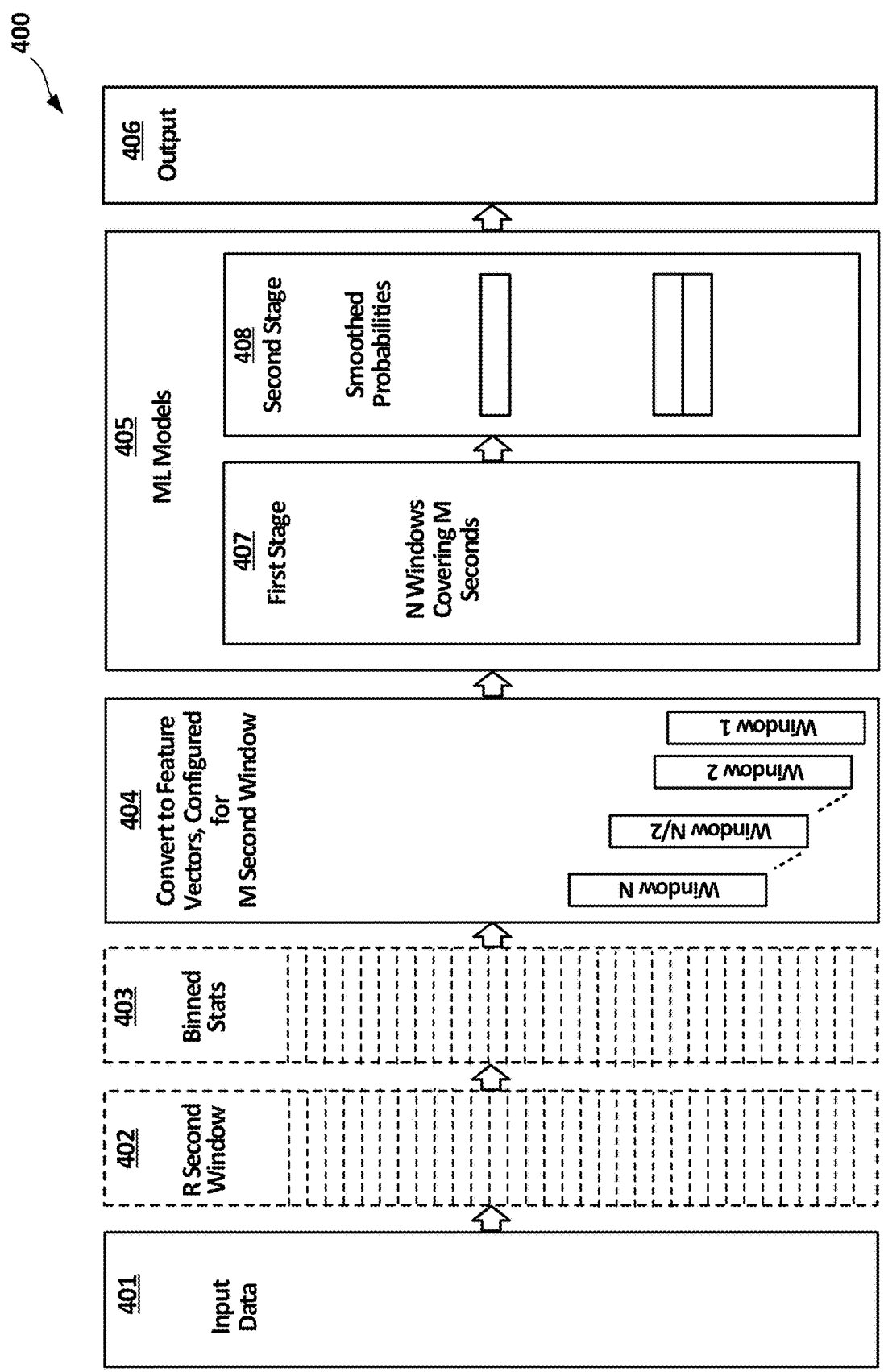
FIG. 4 is a functional block diagram of the FIG. 4 PDL-PM/QoE estimation logic, with graphic illustration of a convert-to-feature vector logic incrementing a time window of stats for input to estimation logic configured to provide ML model estimations of PDL-PM, or statistical model estimations of PDL-PM, or both, in applications or environments such as, without limitation, examples described herein in reference to FIG. 1 or FIG. 2.

FIG. 4 is a functional block diagram 400 of the FIG. 3 PDL-PM/QoE estimation logic (hereinafter "PDL-PM/QoE estimation logic 400"), with graphic illustration of a convert-to-feature vector logic incrementing a time window of stats for input to estimation logic configured to provide ML model estimations of PDL-PM, or statistical model estimations of PDL-PM, or both, in applications or environments such as, without limitation, examples described herein in reference to FIG. 1 or FIG. 2. The PDL-PM/QoE estimation logic 400 can use as input logic a particular configuration 401 (hereinafter "input logic 401") of the FIG. 2 input logic block 201, or an adaptation thereof. The input logic 401 can be configured to obtain CLD and OBD (not separately visible in FIG. 4), for example, by measurement of traffic activity at the FIG. 1 CPE 107 or the FIG. 2 CPE 205, as described above, in addition to estimation or extraction operations on such measurements, as described above in reference to FIG. 2. The CLD and OBD from input logic block 201 can feed the filter and grouping logic block 402. Block 402 which can be, for example, a configuration of the FIG. 2 filter and group logic block 202. As described above for FIG. 2 block 202, the logic block 402 can sort the OBD based, for example, on various ones of the timing information across the different connections. This can form the object-level input data as time-sequenced sets of stats per object. One example of such sorting basis can be request-start times for the objects. Another example sorting basis can be, but is not limited to, response-end times. FIG. 4 binning logic 403 can be a particular configuration of the FIG. 2 binning logic 203.

Referring to FIG. 4, the convert-to-feature vector logic 404 can be configured to increment, by integer N time increments, a time window of width TW seconds, and each increment being Delta t seconds. Preferably, TW is significantly larger than Delta t. At each time increment, a window of TW seconds of stat data can be input to ML PDL-PM estimation block 405. The stat data can be, for example, a look-ahead, look-back implementation, the ML PDL-PM estimation block 405 can generate at each time increment an estimate, corresponding to a time slot of width Delta t seconds, which can be in the center of the window of TW seconds, of whether or not that time slot is part of a webpage loading activity. In one example operation, the incrementing can begin with the convert-to-feature vector logic 404 concatenating TW seconds of request-response pairs and corresponding stats into a first window, visible as "Window 1." The convert-to-feature vector logic 404 can input Window 1 to the ML PDL-PM estimation block 405 which, in turn, can generate an estimation result of "0" or "1" as to whether the Delta t time slot at the center of Window 1 is part of a webpage load. Window 1 can be incremented Delta t, to "Window 2," whereupon convert-to-feature vector logic 403 drops the earliest Delta t input data and appends a newest Delta t input data to the concatenation. The convert-to-feature vector logic 405 can then provide Window 2 to the ML PDL-PM estimation block 405 which, in turn, generates another estimation result, of "0" or "1" as to whether the Delta t time slot at the center of Window 2 is part of a webpage load. The above-described process can continue until convert-to-feature vector logic 404 inputs Window N to the ML PDL-PM estimation block 405 which, in turn, generates an $N^{th}$ estimation result of "0" or "1" indicating whether the Delta t time slot at the center of Window N is part of a webpage load. The process generates a string of N logic 0s and 1s, which can be output as a raw estimation, or smoothed to remove errors, as described in greater detail in later sections.

Figure 5:
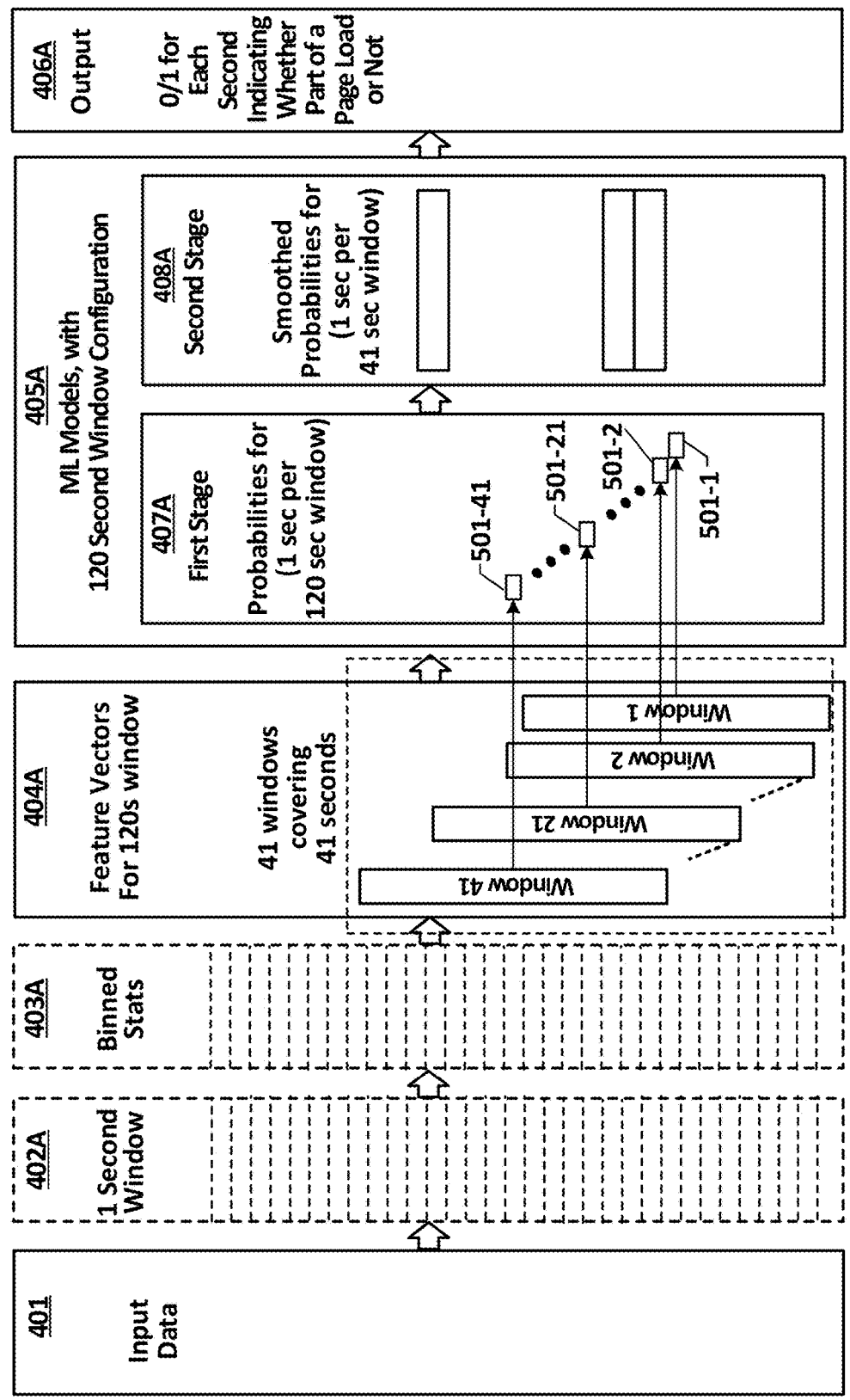
FIG. 5 is an additionally labeled and annotated version of the FIG. 4 functional block diagram, showing specific example configurations of time windows.

FIG. 5 shows, by additional graphics and labeling changes to FIG. 4, one example of a specific configuration 500 of the PDL-PM/QoE estimation logic 400. The respective item numbers of logic blocks of the PDL-PM/QoE estimation logic 500 are "A" suffixed versions of the FIG. 4 item numbers. The PDL-PM/QoE estimation logic configuration 500 includes, as example values, a Delta t of integer 1 second, a number N of windows being integer 41, and each window having a width of integer 120 seconds. It will be understood that Delta t of integer 1 second, as well as N being integer 41, and the windows having a width of integer 120 seconds is only for purposes of example. None among the integer 1 second Delta t, integer 41 value for N, or integer 120 second width of the window are intended as a limitation, or as a preferred value, for practices according to this disclosure and its appended claims. In addition, it will be understood that the comparative magnitudes Delta t of integer 1 second, N being integer 41, and integer 120 second window are not any limitation of, or preference as to comparative magnitudes.

Referring to FIG. 5, the incrementing can begin with the convert-to-feature vector logic 404A concatenating 120 seconds of request-response pairs and corresponding stats into a "Window 1," and inputting that 120 second window to an ML model logic 405A first stage 407A. The first stage 407A generates in turn, at estimation 501-1, a raw estimation of "0" or "1" as to whether the 1 second time slot at the center of the 120 second Window 1 is part of a webpage load. The window can be incremented, for this example, 1 second to "Window 2," whereupon convert-to-feature vector logic 404A can drop the earliest 1 second input data and append a newest 1 second input data to form another 120 second concatenation as Window 2. The convert-to-feature vector logic 404A can then feed that Window 2 to the ML model logic 405A first stage 407A which, in turn, can generate another raw estimation result, of "0" or "1" as to whether the 1 second time slot at the center of the 120 second Window 2 is part of a webpage load.

The above process can continue until convert-to-feature vector logic 404A inputs Window 41 to the ML model logic 405A first stage 407A which, in turn, generates a $41^{st}$ estimation result of "0" or "1" indicating whether the 1 second time slot at the center of Window 41 is part of a webpage load. The result of the above-described integer 41 estimation results can be a string of integer 41 raw binary values, i.e., 41 raw 0s and 1s. The string of 41 raw binary values from ML model logic 405A first stage 407A can be input to the ML model logic 405A second stage 408A. The ML model logic 405A second stage 408A can apply an error correction, e.g., a FIG. 3 simple averaging 305-2, or a FIG. 3 second ML model 305-T. In an implementation using FIG. 3 second ML model 305-T, said ML model can be trained to identify errors.

Operation and effect of the above-described operations includes looking at sliding time horizons of 161 seconds. The 161 seconds is the sum of 120 seconds for the first stage 407A and 41 seconds for the second stage 408A. By looking at sliding time horizons of 161 seconds, a time-series can be produced, each in the series a being logic 0/logic 1 indication of whether the middle of the 161 second time horizon, which is the 81st second, is part of a webpage load. By looking at continuous strings of logic 0s and logic 1s, periods of webpage-load activity and webpage-load durations, from webpage-load start to page load ends, can be determined.

Smoothing is only one example configuration of the second stage 408A. The smoothing can output from output logic 406A a logic 0 or logic 1 for each second of the 41 seconds spanned by the 41 increments of sliding the window (i.e., Window 1 through Window 41).

Figure 6:
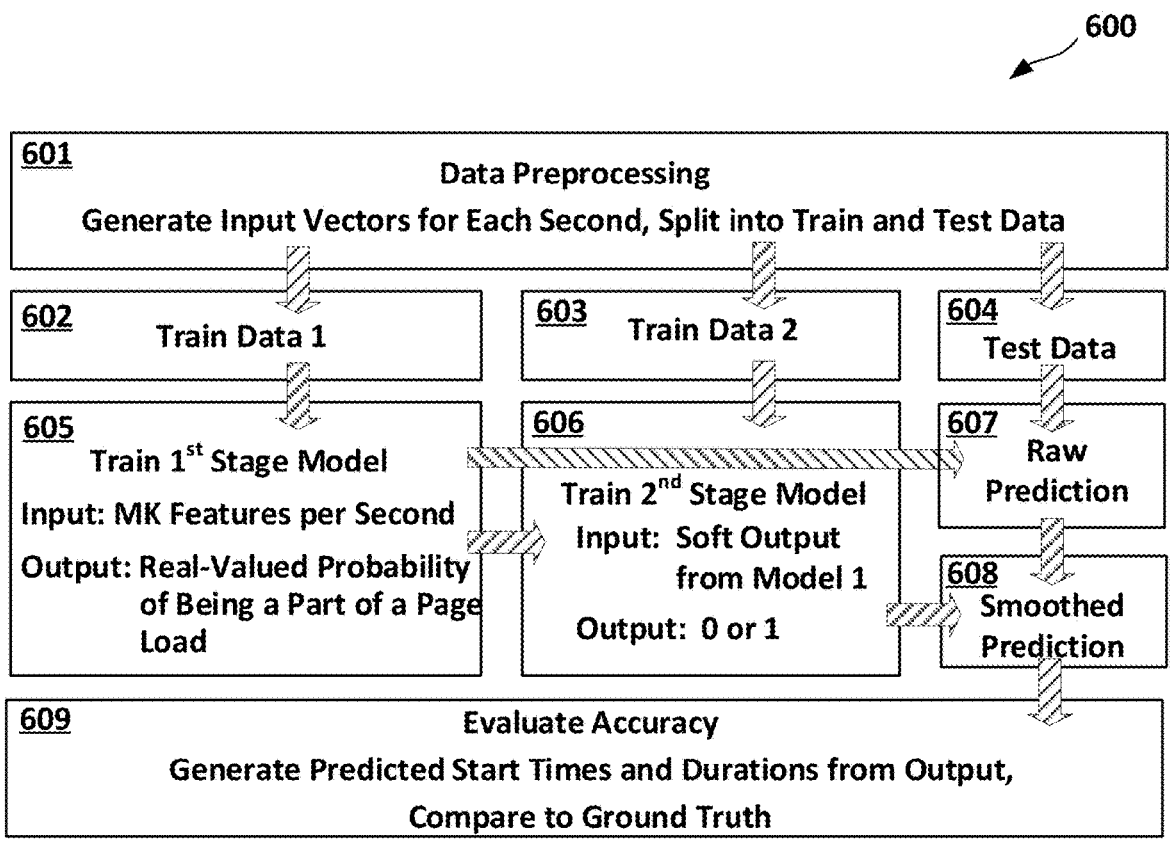
FIG. 6 is a logic flow diagram of an example implementation of a ML pipeline, for training one or more implementations of ML model PDL-PM/QoE estimators in accordance with the present disclosure.

FIG. 6 is a logic flow diagram of an example ML pipeline 600, and example flows and operations thereof, for providing various training of one or more implementations of a PLT estimation logic in accordance with the present disclosure. The pipeline 600 can include a data preprocessing at 601, which can be configured to generate at each in a succession of one-second intervals another request-response feature vector, and split these into training data 1 in block 602, training data 2 in block 603, and test data in block 604. The training data 1 in block 602 can be input to block 605 training of a first stage neural net model, as integer MK features per second. The first stage neural net model trained at 605 can be, for example, the FIG. 3 first stage 307 NN model 309-1 within the 305 ML models. As one alternative, the first stage neural net model trained at 605 can be an implementation of FIG. 4 first stage 407 within the 405 ML models, or its FIG. 5 specific configuration 407A.

In the block 605 training, the first stage model can generate, in response to each feature vector of integer MK features per a second, a real valued soft probability of the features indicating activity that is part of a webpage load. The real valued soft probability from block 605 can be input to a block 606 training of a second stage neural net model, e.g., a smoothing model according to the FIG. 3 second stage 308 second ML model 310-T, or like configuration of the FIG. 4 second stage 408 or FIG. 5 second stage 408A. The block 606 training of the second stage model can also receive training data 2 from block 603. The real valued soft probability from block 605 can be received by raw prediction block 607, which can also receive test data from block 604.

Figure 7:
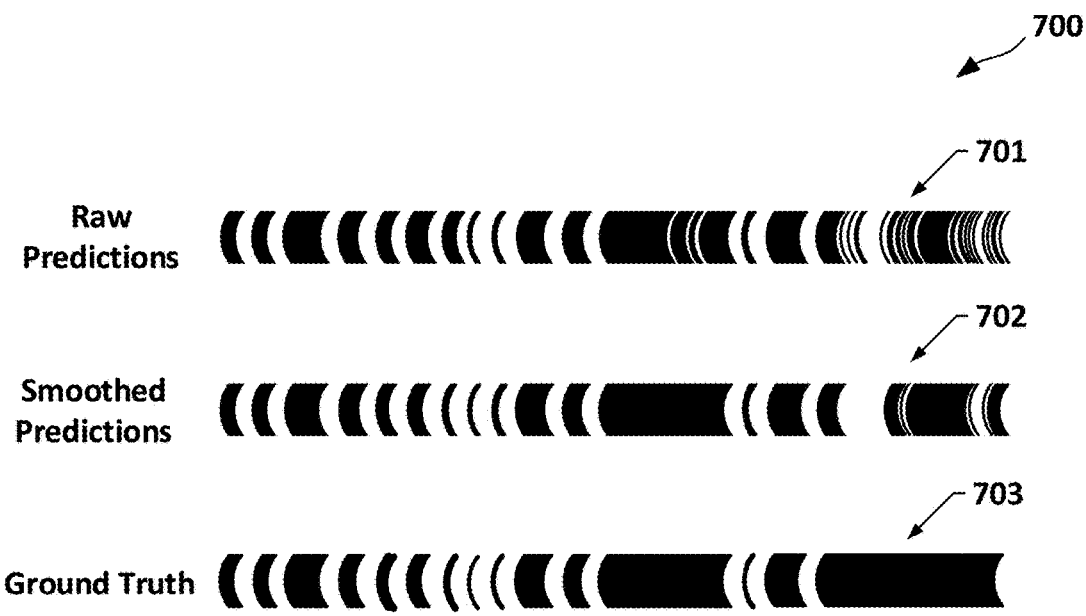
FIG. 7 is a graphical presentation of outputs from a computer model of an example neural network (NN) implementation of a ML model estimator of PDL-PM/QoE, in accordance with disclosed aspects, including raw estimator output and smoothed estimator output, and a graphic reference showing true webpage load activity.

The block 606 training of the second stage neural net model can generate, as smoothed prediction 608, in response to each real-valued soft probability from block 605, a hard 0-hard 1 output. The training process 600 can include, at 609, an evaluation of accuracy of the in-training first stage model and second stage model. The evaluation at 609 can generate, based on the smooth prediction string of 0s and 1s, predicted start times and durations of webpage loads, and compare these to a ground truth obtain from a direct knowledge of page loading states FIG. 7 is a graphical presentation 700 of outputs from a computer model of a neural network webpage load estimator in accordance with disclosed aspects. The presentation 700 includes a graphical representation 701 of a raw estimator output (for brevity, "raw predictions 701"), for example, an output from an estimator in accordance with the first stage 307 of the FIG. 3 two-stage ML model(s) 305. Each horizontal segment of the raw prediction 701 shows the probability of the time interval corresponding to the segment being part of a webpage-load. White segments of the raw predictions 701 correspond to zero probability, and increasingly dark shades of grey correspond to increasingly higher probabilities. Each of the output raw predictions 701 was based on a feature vector formed by another input frame of 120 seconds, as described in reference to FIG. 5.

FIG. 7 also includes graphical representation 702 of smoothed estimator output ("smoothed predictions 702"), which can be, for example, an output from an estimator in accordance with the second stage 408A of the two-stage ML model 405A. For the smoothed predictions 702, each segment is either white (0) or black (1). A string of 1s corresponds to an estimated active webpage load. The smoothed predictions 702 were based on inputting the raw predictions 701 to the computer model of the second stage 408A, with each smoothed output looking at a 41 second window of the raw predictions 701. The 41 seconds correspond to looking back over the 20 seconds preceding the 21st second, and to looking forward over the 20 seconds succeeding the 21st second. The smoothed prediction 702 is a logic 1 for the 41 second window (20 second look-back/20 second look-forward) being part of a webpage-load, and a logic 0 for the 41 second window not being part of a webpage-load.

FIG. 7 also shows, for comparative purposes, a ground-truth 703, for which black corresponds to active webpage-load and white shows periods of inactivity. As can be seen, the smoothed prediction 702 matches the ground-truth 703 except for the last page load. More specifically, instead of the last webpage load being one long page load, the smoothed prediction 702 includes an error showing the last page load as multiple short page loads. It will be understood, however, that application of additional training can significantly reduce such errors.

Figure 8:
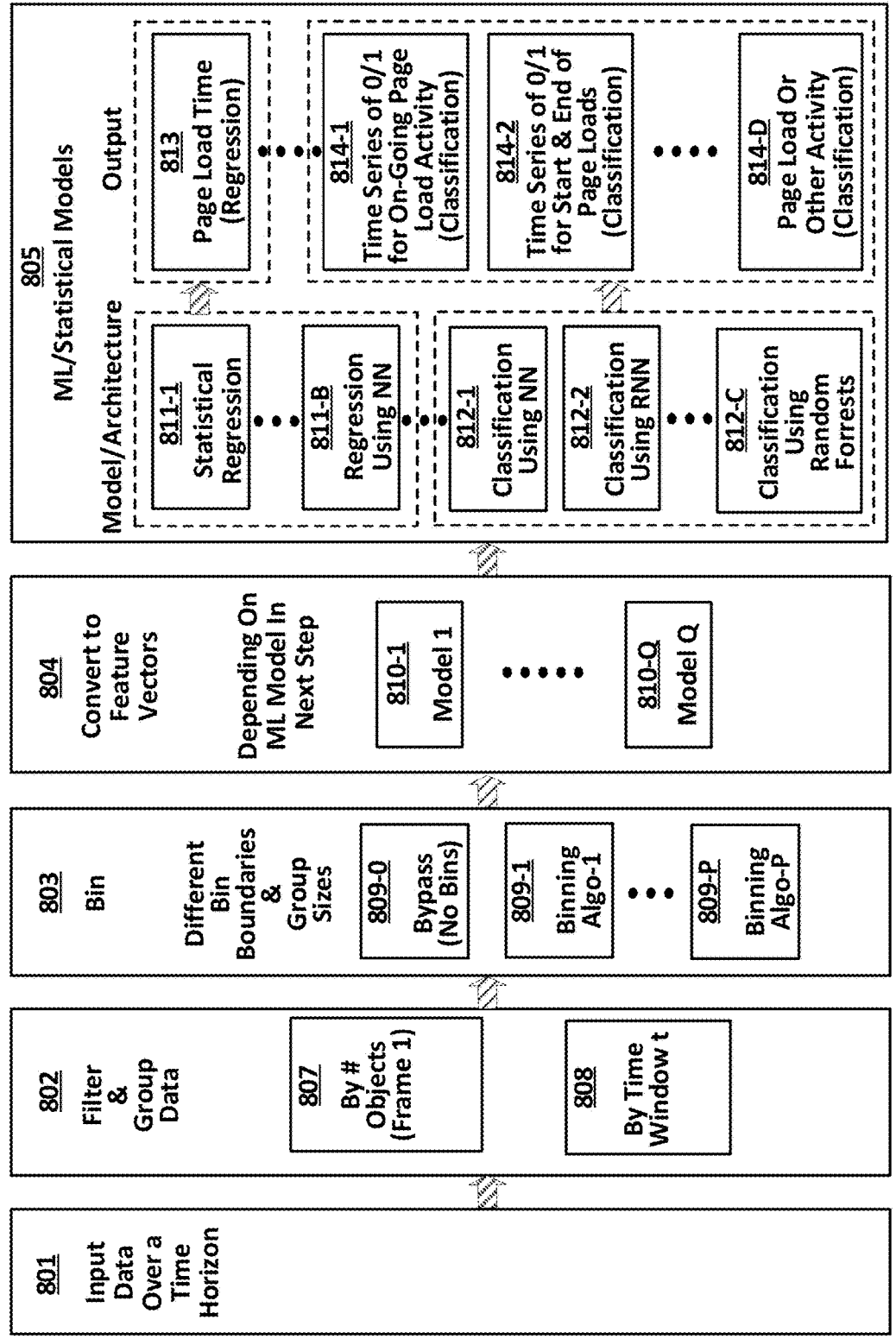
FIG. 8 is a functional block diagram of an example of a multi-configurable implementation of the FIG. 2 PDL-PM/QoE estimation logic.

FIG. 8 is a functional block diagram of an example multi-configurable implementation 800 of the FIG. 2 PDL-PM/QoE estimation logic (hereinafter "multi-configurable PDL-PM/QoE estimation logic 800").

The multi-configurable PDL-PM/QoE estimation logic 800 can include an input logic 801, which can be, for example, in accordance with the FIG. 2 input logic 201, and can be configured in accordance with a particular implementation of multiple-level stat monitor 109 of FIG. 1. The multi-configurable PDL-PM/QoE estimation logic 800 can include, e.g., as an implementation of the FIG. 2 filter and group logic 202, a configurable filter and group logic 802 and, as an implementation of the FIG. 2 binning logic 203 (or the FIG. 4-6 binned stats logic 403) a configurable binning logic 803. The configurable binning logic 803 can be implemented with, and with selectability from among a plurality different binning algorithms. The selection or selectability can be based, for example, on the configuration of subsequent logic blocks of the multi-configurable PDL-PM/QoE estimation logic 800, as will be described in greater detail in subsequent paragraphs.

Referring to FIG. 8, the PDL-PM/QoE estimation logic 800 can also include, e.g., as implementation of the FIG. 2 convert-to-features-vector logic 204 (or the more specific FIG. 4 logic 404), a configurable convert-to-features-vector logic 804. The configurable convert-to-features-vector logic 804 can be configured based on a particular configuration of a configurable ML model(s) logic 805. The FIG. 8 implementation of the configurable ML model(s) logic 805 can be configured to implement both the FIG. 2 estimation model logic block 205 and the FIG. 2 output logic block 206, as described in greater detail later.

Referring to the configurable filter and group logic 802, the FIG. 8 example can include a grouping-by-number-of-objects-per-frame, or "not over a fixed time horizon" logic 807, and a grouping-by-time-window t, or "fixed time horizon" logic 808. Configurable filter and group logic 802 can group stat data into frames having a fixed number f of objects (e.g., frame size=f), as well as grouping-by-time-window t logic 803. Regarding the "not over a fixed time horizon" logic 807, the input data, as the name implies, is not over a fixed time horizon. As frame size f increases, there can be an increase in the probability that the frame will encompass all objects within a webpage load. However, some webpages can be small. Therefore, increases in frame size f can correspondingly increase a probability that the frame can encompass loading of objects from multiple webpages. To accommodate such instances of small webpages, without necessarily decreasing accuracy of the predicted PDL-PM, the configurable ML model(s) logic 805 can be trained to detect, and in some instances return an estimated webpage load time, or other PDL performance metric, for only the first webpage of a website and then ignore subsequent objects.

Referring to the "not over a fixed time horizon," grouping-by-objects-per-frame logic 807, an implementation of the logic 807 can use, for example, stats features such as presented in the example Table 1 above. An example set of values for the Table 1 stats features is presented by Table 2. As one non-limiting example, Table 1 shows integer seven (7) seven rows. As an additional non-limiting example, the "not over a fixed time horizon," grouping-by-objects-per-frame logic 807 can use any one (1,) two (2), or more from among the example five (5) additional features presented earlier in this disclosure. Therefore, one example number of stat features that can be used by the "not over a fixed time horizon," grouping-by-objects-per-frame logic 807 can be as follows: integer 7 from Table 1 and integer 2 of the example integer 5 additional features, which makes a total of integer 9. As to which of the integer 5 additional features can be used as the integer 2, for this example, it is contemplated that various implementations can use the first 2 of the 5 described above.

The multi-configurable PDL-PM/QoE estimation logic 800 can also include, e.g., as implementation of the FIG. 2 binning logic 203 (or the FIG. 4-6 binned stats logic 402) a configurable binning logic 804. The configurable binning logic 804 can be implemented with, or can be implemented as capable of selecting among a bypass (no binning) 809-0 and integer P different binning algorithms. The integer P algorithms can include, for example, a first binning algorithm 809-1, and additional algorithms continuing through to a $P^{th}$ binning algorithm 809-P. The PDL-PM/QoE estimation logic 800 can also include, e.g., as implementation of the FIG. 2 convert-to-features-vector logic 204 (or the more specific FIG. 4 logic 404), a configurable convert-to-features-vector logic 804 that can include a set of integer Q options. The Q options can include a first convert-to-features-vector logic 810-1, through a $Q^{th}$ convert-to-features-vector logic 810-0.

Referring to FIG. 8, the graphical blocks representing the component features of the configurable ML model(s) logic 805 will be referenced, for convenient referral to the figure, according to their position within the 805 block. The configurable ML model(s) logic 805 of FIG. 8 can include a set of integer B models that will be referred to as left column first models, labeled on FIG. 8 as logic blocks 811-1 through 811-B (collectively "left column, first models 811"). The configurable ML model(s) logic 805 can include a set of integer C models that will be referred to as left column second models, labeled on FIG. 8 as logic blocks 812-1, 812-2, . . . , 812-C (collectively "left column, second models 812"). It will be understood that integer B, or integer C, or both, can be integer 1, i.e., the left column, first models 811, or the left column, second models 812, or both, can be implemented by a single estimation model.

The output models of the configurable ML model(s) logic 805 can include what will be referred to as a right or output column first model 813, which can be, for example, a webpage load time regression model 813. The output models of the logic 805 can also include what will be referred to as a right or output column second set of models, labeled on FIG. 8 as blocks 814-1, 814-2, through 814-D (collectively "right column, second models 814"). In an aspect, each of the left column models 811 and 812 can feed only right column, first models 813 or one among the right column, second models 814, but not both. For example, the FIG. 8 left column first models 811 can feed the right or output column first model, i.e., the webpage load time regression model 813. Similarly, the FIG. 8 left column second models 812 can feed the right or output column second models 814.

The left column first models 811 can include, for example, a statistical regression model 811-1, and a regression using NN model 811-B. The NN model 811-B can be configured, for example, with one or with multiple hidden layers of different sizes. As such, the NN model 811-B can be employed to directly train and predict the PDL-PM based on the input features. The left column second set of integer C models can include a classification using NN logic 812-1, a classification using RNN logic 812-2, and continuing to a classification using random forest logic 812-C. The classification using NN logic 812-1 can be configured, for example, as a "Start/Stop Classification" model, that can classify each time unit (e.g., each second) as either being a start of a webpage-load, an end of a page-load, or neither. The NN logic 812-1 "Start/Stop Classification" model can also be configured as trainable to identify page-load starts and ends, and ignore other traffic patterns, for example, corresponding to non-webpage load activities, such as streaming video, file uploads or downloads, and so forth. model also includes classification into "page-load" or "other activity". This Start/Stop Classification model can be similar or different to the Continuous model in terms of the NN architecture. In particular, a single NN with fixed time window of input features can be utilized, and can be configured with three outputs, S/E/0 (start, end, neither) where the model output associates the time unit of interest as being start/end of a webpage load or neither. Alternatively, implementation can use two different NN models, one for identifying starts and one for identifying ends.

The configurable ML model(s) logic 805 rightmost or output column first model 813 and second models 814, described above, can be an implementation of the FIG. 2 output processing logic 206. One or more implementations of the configurable output logic 806 can include, for example, a set of integer Q logic blocks, e.g., a classification-between webpage load or other activity logic 814-1, a regression type PLT estimation logic 814-2, a time series of 0/1 for start and end of webpage load classification logic 814-3, and continuing to a time-series of 0/1 for ongoing page load activity logic 814-Q.

Above-described implementations include formation of inputs from measured connection-level statistics and estimated object-level statistics. In some implementations additional inputs and metrics can be utilized in estimating QoE. In one such implementation, network level stats, e.g., IP packet stats, or DNS request-responses, or both, can be utilized. In another implementation, which is not exclusive of network level stats or DNS request-responses, above-described inputs from measured connection-level statistics and estimated object-level statistics can be combined with additional stats, from other nodes in the network paths. Examples can include stats from a client-device, e.g., from the webpage access/download application 101 described above.

Figure 9:
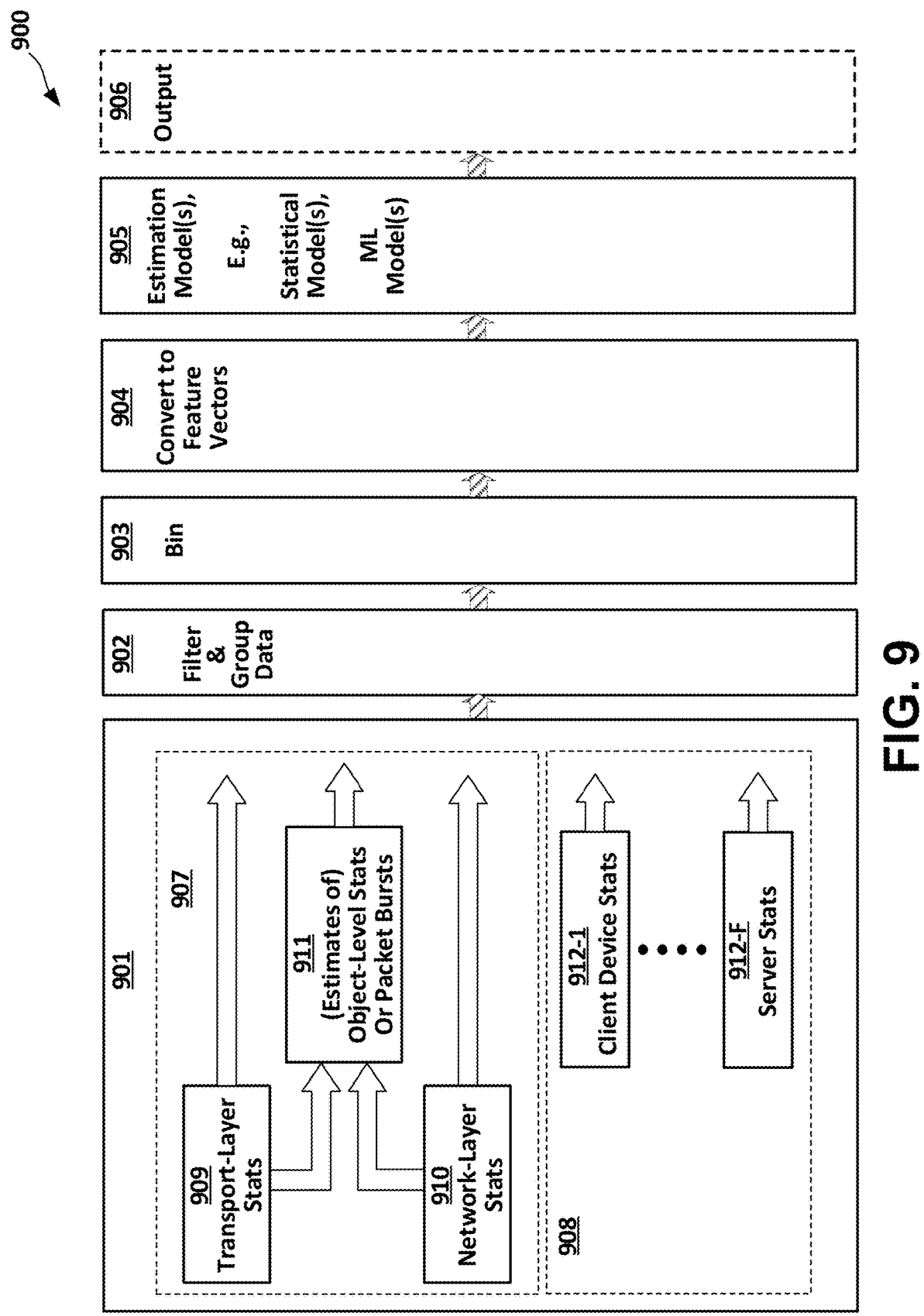
FIG. 9 is a functional block diagram of an implementation of another example PL PM/QoE estimation processor, featuring estimation of PDL-PM/QoE based at least in part on additional or alternative monitoring inputs.

FIG. 9 is a functional block diagram of an example PL PM/QoE estimation processor 900 in accordance with this disclosure. In an implementation, the PL PM/QoE estimation processor 900 includes, as additional inputs and metrics in estimating PL PM/QoE, measured stats from a client-device, e.g., from the webpage access/download application 101 described above, or from a server, e.g., server stack 103, or both.

For brevity, "PL PM/QoE estimation processor 900" will be alternatively recited as "processor 900." In an example implementation, the processor 900 can include, in place of the input block 201 of the FIG. 2 processor 200, a multiple stat input/estimation logic 901. The multiple stat input/estimation logic 901 can, for example, couple to or interface with the FIG. 1 CPE 107 as well as to the FIG. 1 webpage access/download application 101. The multiple stat input/estimation logic 901 can also be implemented as a distributed process, for example, as processing resources of the CPE 107, combined with the computer-executable instructions stored by, or in storage accessible to the CPE 107, or as processing resources of the UE 102, combined with computer-executable instructions stored by, or in storage accessible to the UE 102, or both.

Regarding logic block 902 fed by 901, and logic blocks 903, 904, 905, and 906, description of these will assume, as to focus description on features distinctive to processor 900, that all are configured such as described by any one or more among FIGS. 2, 3, 4, 5, and 8. For example, the filter and data group logic 902 can be configured according to the FIG. 2 filter and data group logic 202, or any among the filter and data group logic 302 and 402 of FIGS. 3-4. Bin logic 903, convert-to-feature-vector logic 904, estimation model(s) logic 905, and output logic 906 can be configured as described for the FIG. 2 logic blocks 203, 204, 205, and 206, respectively, or as described for FIG. 3 logic blocks 303, 304, 305, and 306, or FIG. 4 logic blocks 403, 404, 405, and 406, respectively. In addition, in an implementation where the multiple stat input/estimation logic 901 provides the input logic 401A of the specific configuration of FIG. 5, the filter and data group logic 902, bin logic 903, convert-to-feature-vector logic 904, estimation model(s) logic 905, and output logic 906 can be configured as described for the FIG. 5 logic blocks 402A, 403A, 404A, 405A, and 406A, respectively. In an implementation, the filter and data group logic 902, bin logic 903, and convert-to-feature-vector logic 904 can be configured as described for the FIG. 8 logic blocks 802, 803, and 804, respectively. Also, in such an implementation, functionality of FIG. 9 logic blocks 905 and 906 can be provided by the FIG. 8 ML/Statistical model(s) logic 805.

Referring to FIG. 9, the multiple stat input/estimation logic 901 can include a first logic block 907 and a second logic block 908. First logic block 907 and second logic block 908 do not necessarily define any hardware or processing architecture, or location or geographic distribution of resources or allocation of processing. On the contrary, as for all logic blocks described herein, it will be understood that except where explicitly stated otherwise, or made clear from the context to have a different meaning, graphical blocks are groupings of functionalities, features, and operations, and the "grouping" can be for purposes of sequencing and ordering of description, and not necessarily proximity of operation or implementation.

In the FIG. 9 implementation, functionalities of the first logic block 907 can pertain to layer stats, or to packet burst data, or to both. Accordingly, first logic block 907 can be alternatively referred to as "layer stat/packet burst estimation block 907." Functionalities of the second logic block 908 can pertain to client/server stats and, accordingly, second logic block 908 can be alternatively referred to as "client/server stat block 908." The layer stat/packet burst estimation block 907 can include a transport layer stats block 909 and can include a network layer stats block 910. Both the transport layer stats block 909 and the network layer stats block 910, can feed the filter and data group logic 902. In an implementation, to provide for applications such as those in which object-level stat data may be impractical to obtain, the transport layer stats block 909 and the network layer stats block 910 can feed logic block 911, configured to estimate object-level stats, or packet bursts, or both. Logic block 911 can be configured to estimate, from obtainable packet burst measurements, whether the burst corresponds to an object download and, if so, can estimate stats such as object size and request time.

The client/server stat block 908 can include integer F additional stat blocks, such as the examples labeled 912-1 . . . , 912-F−1, and 912-F. Some Web QoE metrics can utilize client-side and server-side load information, such as CPU-utilization, memory-usage, etc. For the object-level stats, implementations can obtain the estimates using other methods, such as TLS-record layer, as described in the '551 application.

Figure 10:
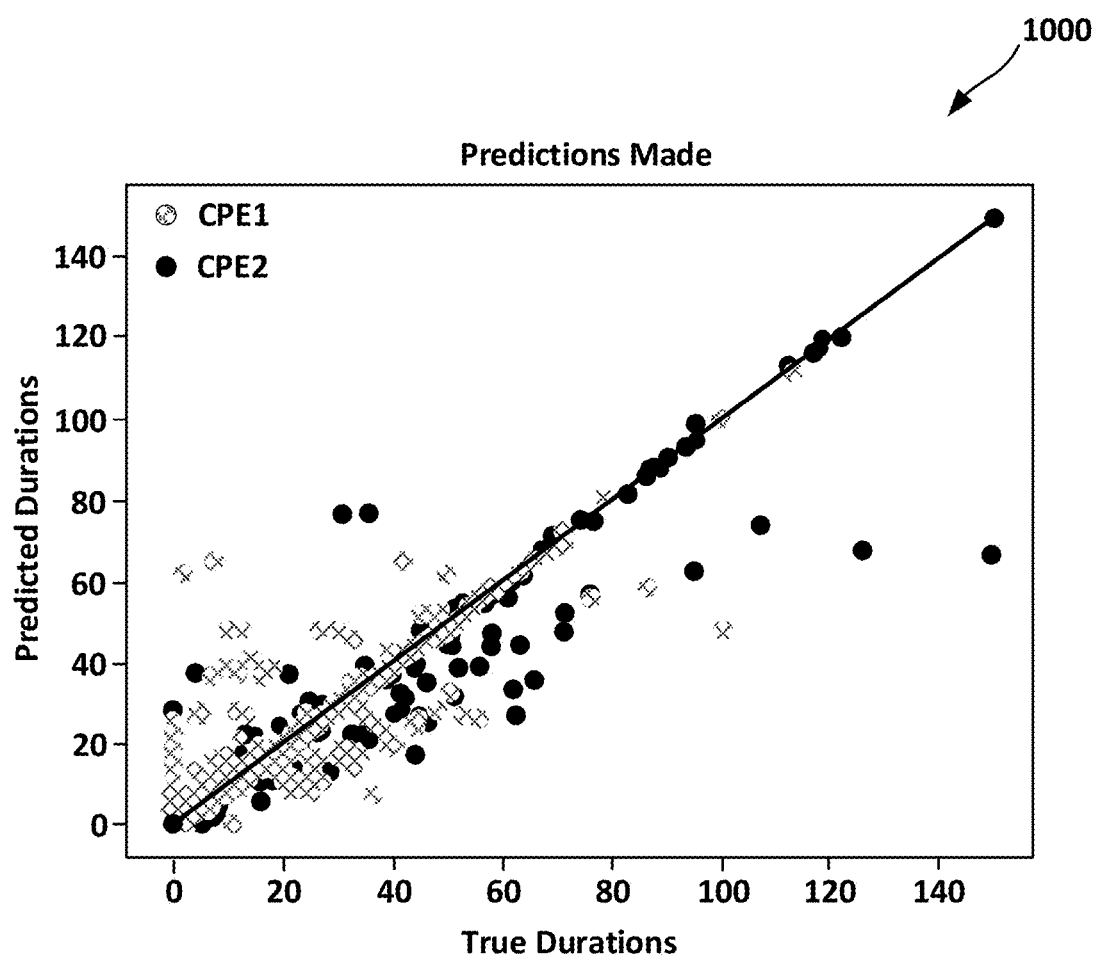
FIG. 10 is a graphical presentation of generated results based on inputting passively obtained object-level stat data and connection-level stat data corresponding to two applications requesting and loading webpage objects.

FIG. 10 is a graphical presentation 1000 of computer-generated results based on passively measured OBD and corresponding extracted OBD from respective CPEs for each of two client devices, in visiting of webpages and associated requesting and loading of webpage objects. The two CPEs are referenced in this disclosure as "CPE-1" and "CPE-2" (not separately visible in the figures). These scripts were used to collect data from two different respective CPEs, labeled "CPE-1" and "CPE-2," selected as likely to experience different network conditions. The measured CLD and extracted OBD was obtained using Google Chrome on the client devices, cyclically visiting 50 HTTPS websites, from Alexa Top-100, and recording the webpage load time as determined by the Chrome's Inspect Element tool. Data were collected for several weeks. The test evaluation used the two-stage NN model described in detail above. The model was trained on the same combination of about 5000 webpages on a terminal (not separately visible) having Internet access through CPE1 and on another terminal (not separately visible) having Internet access through CPE2. Of the training data, approximately 10% was used for validation. To prevent overfitting, training was stopped if the validation loss started to grow as the loss approached zero. The same data was used to fit the First-Stage Model (which gave probabilities for each second) as well as Second-Stage Model (which smoothed-out the raw probabilities to give a strings of 0/1s).

After the models were trained with low validation error, there was evaluation of generalization error on unseen data. The evaluation used approximately 7000 webpages on the CPE1 and CPE2 terminals. To evaluate the accuracy of the trained models on unseen data, various metrics were calculated, including: mean-square error for predicted durations, mean percentage error, missed predictions, extraneous predictions, etc.

Using the 'best' model described earlier with two stages of NN, test evaluation predicted 99.4% of webpage loads with a root mean square error of 3 seconds, and percentage error of 9.6%. Of the total predictions (true and extraneous), 97.7% corresponded to real page loads. Test evaluation therefore shows the model gave very accurate estimate of Page Load Time QoE Implementations can use alternative estimation techniques, that do not have to rely on the use of ML. For example, implementations can directly use connection-level and object-level statistics, using a rule-based approach.

Figure 11A:
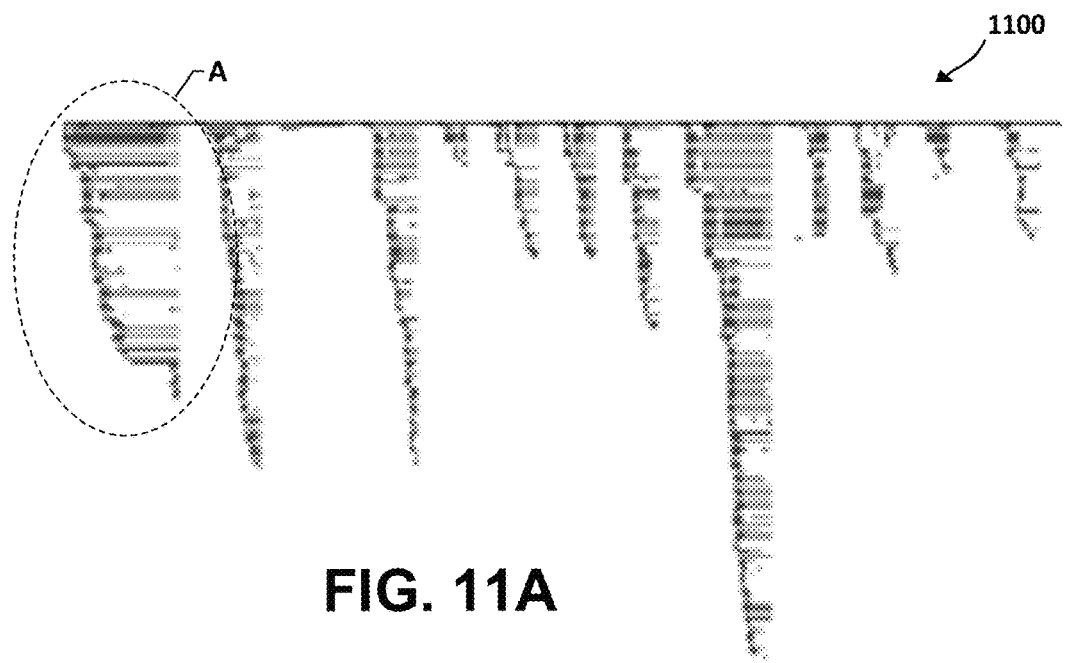
FIG. 11A is a waterfall diagram graphically presenting results of test evaluation using rule-based determination of webpage load time, based on object-level data for visits to a plurality of encrypted websites.
Figure 11B:
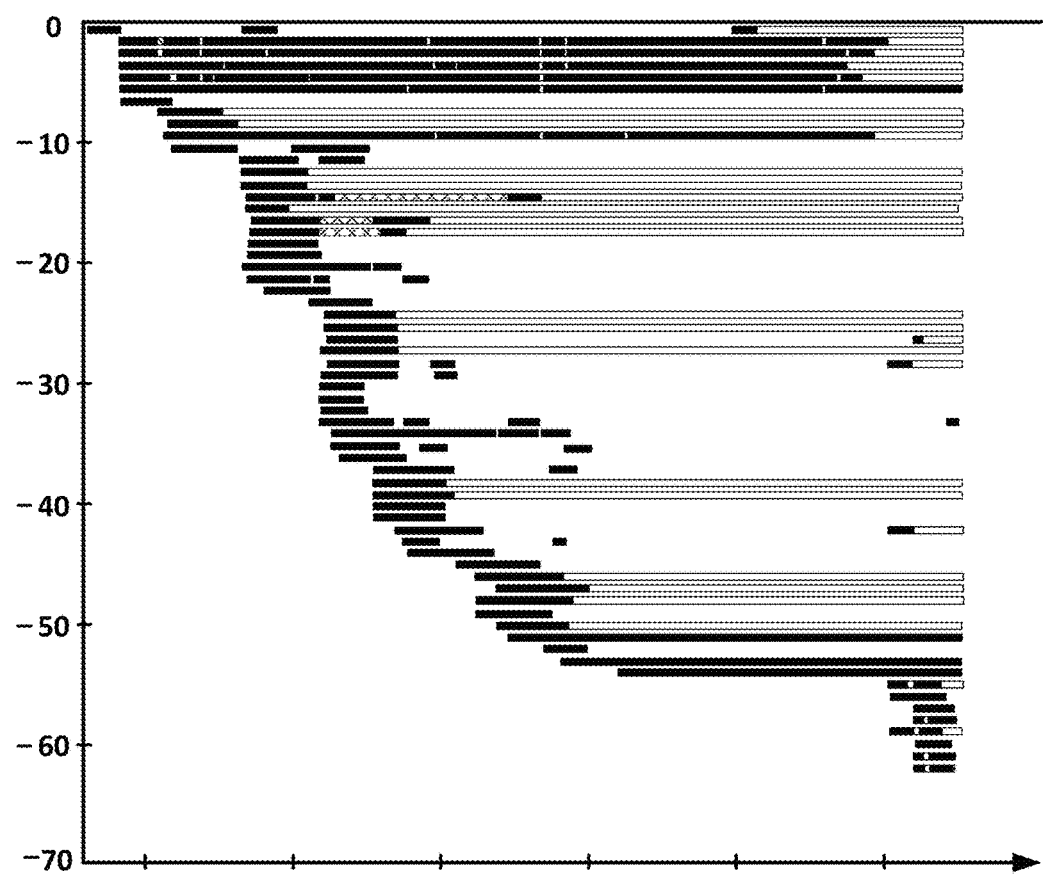
FIG. 11B is an enlarged view of FIG. 11A region "A."

FIG. 11A is a waterfall diagram 1100, graphically presenting results of test evaluation using rule-based determination of webpage load time, based on object-level data for visits to a plurality of encrypted websites. FIG. 11B is an enlarged view of FIG. 11A region "A." Cross-hatched regions represent object request (and wait time for start of response) and non-hatched regions represent an object response. Simultaneous connections are stacked. Referring to FIG. 11B it can be seen that webpage loads are clearly defined by groups of objects being downloaded. The is due, in part, to the test evaluation assuming the loading client closed all connections at the end of the page load and before starting a new page load. The test evaluation therefore assumed all webpage loads begin and end with zero active connections. Accordingly, in test evaluation runs, the number of active connections was initialized to zero. The number of active connections was incremented when the first object of a connection was seen, and decremented whenever the last object of a connection was seen, or the connection was closed. At each instance of the active connection number reaching zero, a webpage load end was recorded. At each instance of the connection number being incremented from logic 0 to 1, a page load start was recorded. Page load durations were calculated as the difference between the recorded start and recorded end.

Figure 12:
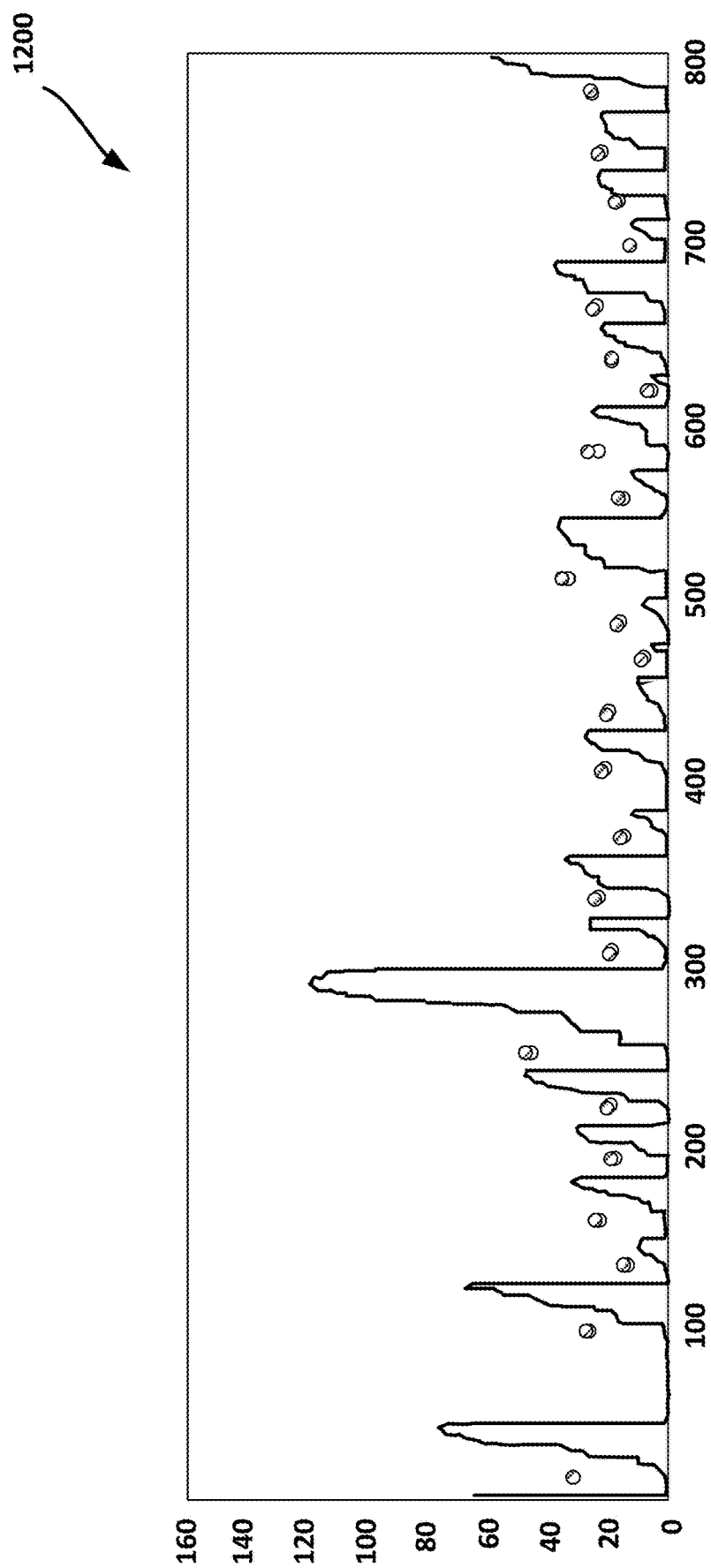
FIG. 12 is a graphic presentation of estimation results, generated by a computer model of one example rule-based PDL-PM estimation logic in accordance with the present disclosure, in response to inputs that include object-level stat data and connection-level stat data corresponding to clients requesting and loading webpages.

FIG. 12 is a graphic presentation 1200 of estimation results, generated by a computer model of one example rule-based PLT estimation logic, in accordance with the present disclosure, when fed over a time interval with the inputs that include OBD and CLD corresponding to clients requesting and loading webpages. Plot line 1201 indicates the number of active connections at any given point in time. Solid-fill white dots (visible, but not separately numbered) mark the actual duration of a page load that starts at the given time, and cross hatched dots (visible, but not separately numbered) mark estimated page load times. The estimated webpage load times indicated by the cross-hatched dots were generated by subtracting rule-based estimation of page load start time from rule-based estimation of page load end time. Without subscribing to any particular theory, the inventors noted, as can be seen from FIG. 12, that there appeared to be a consistent underpredicting of the true durations by a small amount, e.g., less than approximately 1 sec.

Without subscribing to any particular theory, there may be applications and scenarios in which certain implementations of the rule-based method may appear to estimate webpage load times more accurately than in other applications and other scenarios. For example, current versions of browsers such as Google Chrome, Mozilla Firefox, etc., may not close all connections at the end of a page load. Instead, connections for one webpage load can carry over into the next page load. Hence, long open connections from previous website visit, for example, can be re-used by the browser for the current visit. Absent additional features, though, there can be a potential of encountering difficultly in distinguishing between page loads.

Features of systems and methods according to this disclosure can provide the additional features that, in turn, can be a technical solution to the above-described potential for difficultly in distinguishing between page loads. The additional features can include heuristics, which can be configured to provide, even without a robust means to filter background connections, definition of the starts and ends of page load times. However, features can include a background filtering that can be configured overlook extended background connections that a client device, or some of its applications, may keep open. Examples of extended background connections can include, but are not limited to, connections to webmail, software updates to server(s), and the like. Implementations of systems and methods according to this disclosure can include filters configured to discard such long open, i.e., extended, connections, for example, during a monitoring a certain time window for a page load. The filtering can be based, for example, on a time threshold. Example values of a time threshold can include, but are not limited to, 300 seconds, 400 seconds, 600 seconds, and all ranges between, greater than, or less than these examples.

In one or more implementations, QoE can be estimated using metrics additional to, or alternatives to, webpage load time. Examples can include, without limitation, Document Object Model (DOM) Content Load Time, and Speed Index. Both of these metrics are known to persons of ordinary skill, and are published in the technical literature. The interested reader can refer, for example, to E. Bocchi, L. D. Cicco, and D. Rossi, "Measuring the Quality of Experience of Web Users," Proceedings of the 2016 workshop on QoE-based Analysis and Management of Data Communication Networks Internet-QoE '16). Further detailed description is therefore omitted.

While some of such metrics can be estimated by the web browser/client device (e.g., FIG. 1 webpage access/downloading application 101), others can be estimated by a passive observation external to the web browser, e.g., at a CPE such as the FIG. 1 CPE 107. Such metrics can include, for example, metrics indicative of webpage loading to a completion state. Alternative metrics can be indicative, for example, of downloading of a defined portion, or estimated portion, of the webpage objects.

Each of the Object Index and Byte Index can be determined based on packet and object arrival timing within the webpage load duration using, for example, Equations (1) and (2).

$$\text{Object Index} = \int_0^{tplt} (1 - x_O(t)) dt \qquad \text{Equation (1)}$$

$$\text{Byte Index} = \int_0^{tplt} (1 - x_B(t)) dt \qquad \text{Equation (2)}$$

The Equation (1) and (2) integrals can span from start of webpage load (t=0) to end of webpage load, $t=t_{PLT}$. $X_O(t)$ and $X_B(t)$ correspond to the object completion and byte completion ratio at time t, respectively. Once the start and end of a webpage load are known, or estimated, the total objects and bytes for that webpage load can be determined. Then knowing the object arrival and byte arrival times (which can be captured by looking at transport protocol/IP packet arrival times), the object and completion ratio can be calculate the object and completion ratio at each time. Accordingly, the Object Index and Byte Index metrics can be defined upon knowing the object and byte arrival times, and the webpage load start and end times.

Lower values for the Object Index and Byte Index metrics can imply earlier completion of a majority of the objects/bytes of a webpage. The present inventors believe, without subscribing to any particular theory, that the Object Index and Byte Index can additionally capture visual aspects of page completion, especially for newer trends of complex web-pages. In addition, after obtaining or estimating webpage load starts and ends, as described in greater detail above, and the object and byte arrival timestamps are known, the Object Index and Byte Index can be estimated. Accordingly, the above-described implementations can determine various web-browsing related metrics without requiring data collection at the client-end.

Figure 13:
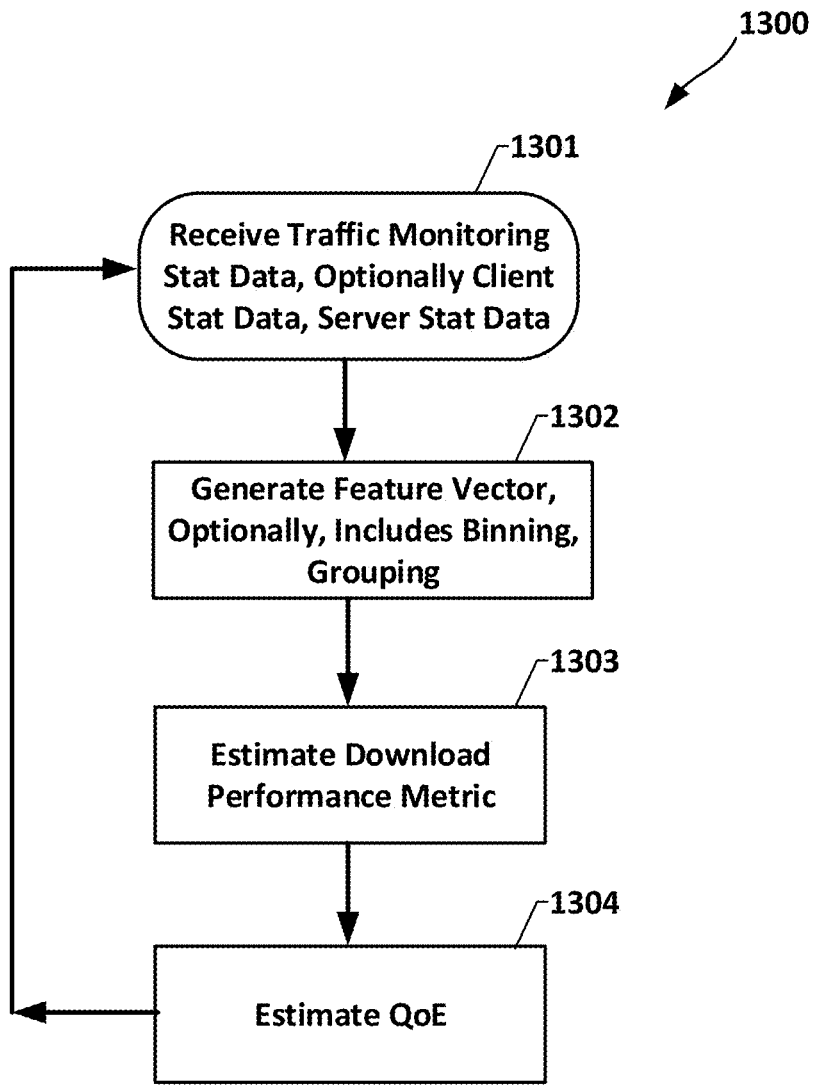
FIG. 13 is logic flow diagram of operations in an implementation of an example process in estimating PDL-PM and QoE, in systems and methods in accordance with the disclosure.

FIG. 13 is logic flow diagram of operations 1300 in an example implementation of a process in estimating PDL-PM and QoE, provided by systems and methods in accordance with the disclosure. Description will refer to FIG. 2 implementations of DL-PM/QoE estimation logic, to provide convenient referencing of example operations to the figures. Description of operations in the flow 1300 will begin at 1301 with receiving stat data from passive monitoring, e.g., by multiple-level stat monitor 109, of traffic between a client webpage access application (e.g., application 101) and a server resource, such as server stack 103, hosting webpage 104. Operations in the flow 1300 can then proceed to 1302 and apply operations of generating a feature vector, based at least in part on at least a portion of the stat data received at 1302. Non-limitative examples of operations at 1302 can be as described in reference to FIG. 3, blocks 302, 303, and 304, and in reference to FIG. 4 blocks 402, 403, and 404 and, for example, FIG. 8 blocks 802, 803, and 804.

Example instances of the flow 1300 can proceed to 1303 and apply operations for estimating a download performance metric for the application downloading the webpage from one or more servers in the server stack, based at least in part on at least a portion of the feature vector. Non-limitative examples of operations at 1303 can be as described in reference to FIG. 3, block 305; FIG. 4, block 405, and FIG. 8 block 805. Example instances of the flow 1300 can proceed to from 1303 to 1304 and apply operations for estimating QoE. Non-limitative examples of operations at 1304 can be as described in reference to FIG. 3, block 306; FIG. 4, block 406, and FIG. 8 block 805.

The flow 1300 can be a loop, and therefore can return to 1301 after 1304. It will be understood that operations 1301, 1302, 1303, and 1304 can be performed in a pipeline manner, for example, such that operations at 1303 can perform operations of feeding a window of stat data to an estimation model, concurrent with block 1302 generating another feature vector.

Figure 14:
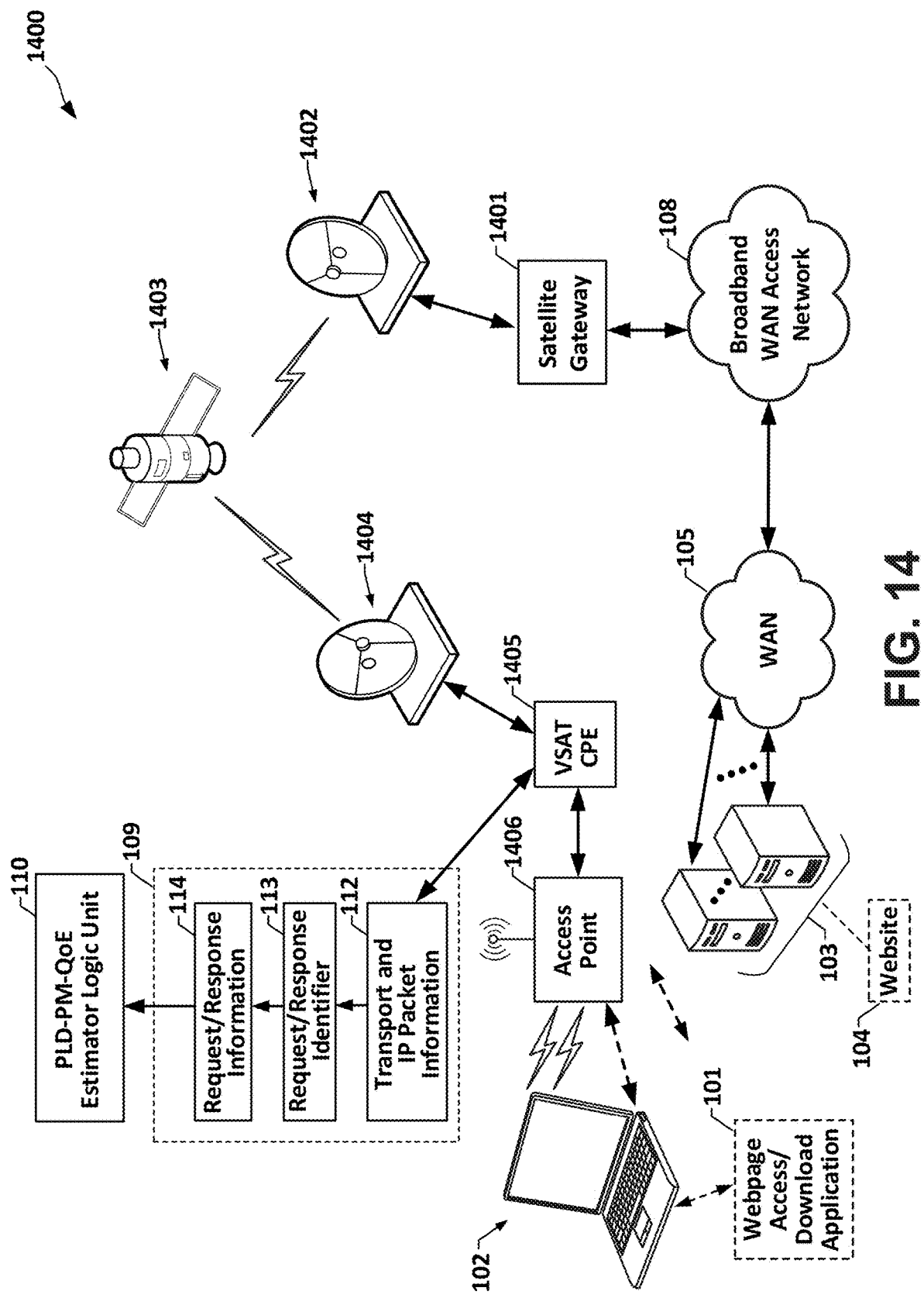
FIG. 14 is a functional block diagram of an implementation of a system supporting transport protocol webpage download, with a physical layer that includes a satellite link, and providing passive estimation of webpage load performance metrics, and estimation of QoE utilizing same, in accordance with this disclosure.

FIG. 14 is a functional block diagram of an implementation of a system 1400 which can be according to FIG. 1 system 100 modified to include a physical layer that includes a satellite link. The system 1400 can support client-server webpage loading and providing passive estimation of webpage load performance metrics, and estimation of QoE utilizing same, as described above. The system 1400 webpage access/download application 101, UE 102, WAN 105, and server stack 103 may each operate as discussed above in connection with FIG. 1. The server stack 103 via WAN 105 can transmit packets toward UE 102 by a path that can include broadband WAN access network 108 to satellite gateway 1301, or directly Path not visible in FIG. 14) to the satellite gateway 1401. The satellite gateway 1401, via satellite dish 1402 can send the packets over a forward uplink (FLU) to orbital satellite 1403. The orbital satellite 1403 can send such packets over forward downlink (FDL) to VSAT dish 1404 coupled to a VSAT terminal CPE 1405. The UE 102 can communicate with the VSAT terminal CPE 1405 via an access point 1406, which can be wireless Wi-Fi device, wired (e.g., Ethernet) Wi-Fi, or both.

The orbital satellite 1403 can be, for example, a space-borne High Throughput Satellite (HTS), arranged in a bent-pipe satellite communication configuration, as visible in FIG. 14. The VSAT terminal CPE can be configured to provide a reverse uplink (RLU), to the satellite 1403, for communication over a reverse downlink (RDL) to the satellite gateway server 1401.

In some implementations, more than one satellite may be used, or other types of satellites may be used, including, but not limited to, Fixed Satellite Service (FSS) High Throughput Satellite (HTS). In some implementations, satellite 1403 can be configured to receive data from one or more gateway stations for retransmission via spot beams to remote sites located within cells defined by the =spot beams.

Figure 15:
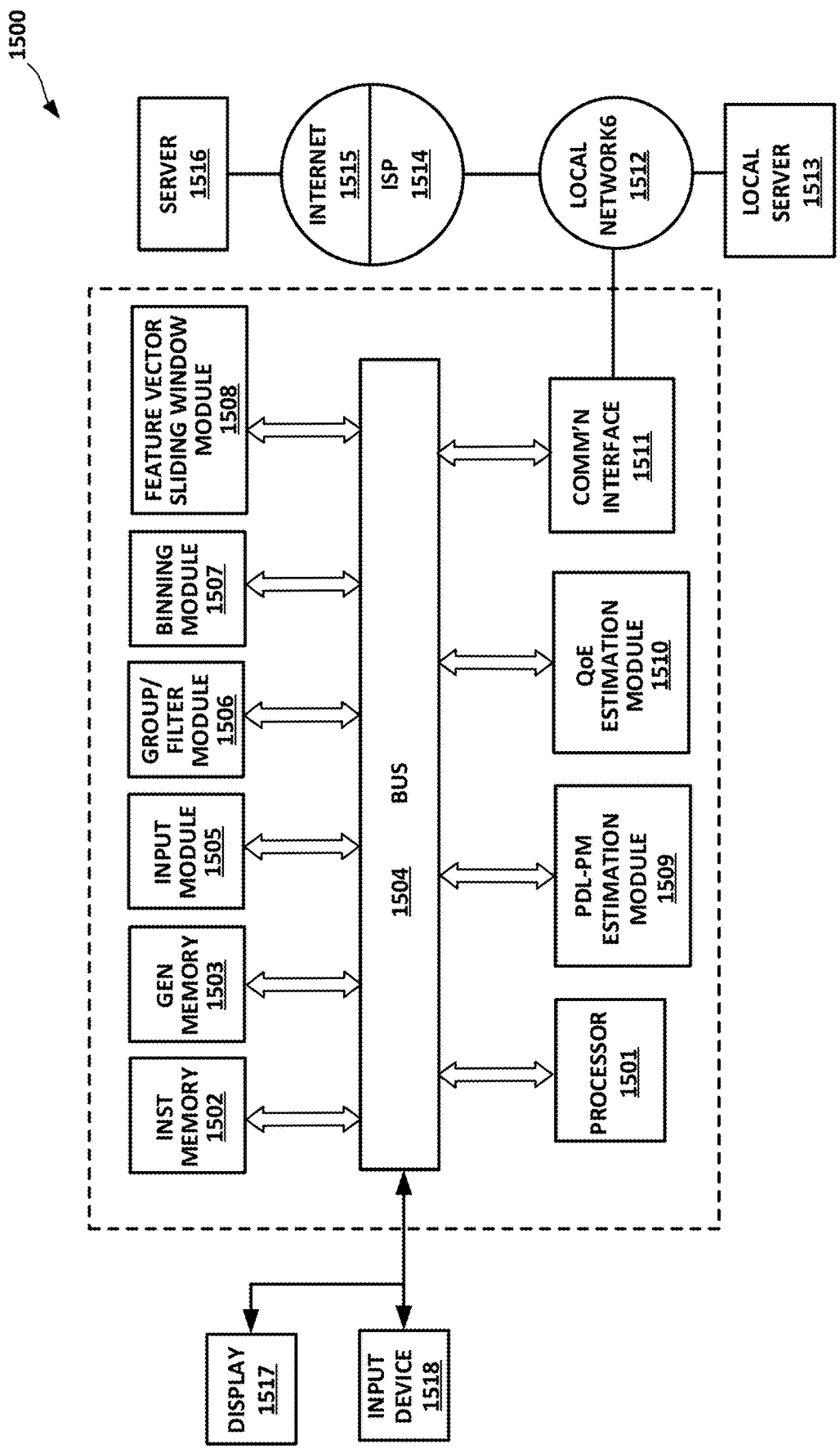
FIG. 15 is a functional block diagram of an example computer system upon which aspects of this disclosure may be implemented.

FIG. 15 is a block diagram illustrating a computer system 1500 upon which aspects of this disclosure may be implemented, such as, but not limited to, particular function blocks and processes described in reference to FIG. 1, 2, 3, 4, 5, 6, 9, or 10. It will be understood that logic blocks illustrated in FIG. 15 represent functions, and do not necessarily correspond to particular hardware on a one-to-one basis. The computer system 1500 can include a data processor 1501, instruction memory 1502, and a general purpose memory 1503, coupled by a bus 1504. The instruction memory 1502 can include a tangible medium retrievably storing computer-readable instructions, that when executed by the data processor 1501 cause the processor to perform functions, processes, and operations implementing an input buffer module 1505, a grouping/filter module 1506, a binning module 1507, a sliding window feature-vector module 1508, an estimation model(s) module 1509, and a QoE module 1510. The estimation model(s) module 1509 can be configured as, or to provide selectability between, any one or more from among a group or collection that can include, for example, a stat-based estimation model, a ML estimation model, a rules-based estimation model. The estimation model(s) module 1509 can implement, for example, an ML NN estimation model.

The computer system 1500 can include a communications interface 1511, configured to interface with a local network 1512 for accessing a local server 1513, and to communicate through an ISP 1514 to the Internet 1515, and access a remote server 1516. The computer system 1500 can also include a display 1517 and a user interface or other input device 1518, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computer-implemented method for predicting quality of experience (QoE) performance of an application downloading a webpage over a network, comprising:
  determining a stat data corresponding to a traffic through a network node of a network path between the application and a server stack;
  generating a feature vector, based at least in part on at least a portion of the stat data;
  estimating a download performance metric for the application downloading the webpage from one or more servers in the server stack, based at least in part on at least a portion of the feature vector; and
  estimating a QoE value, based at least in part on the estimated performance metric.

2. The computer-implemented method of claim 1 for predicting QoE performance of an application downloading a webpage over a network, wherein
  estimating the download performance metric is based, at least in part, on inputting the feature vector to a machine learning (ML) model, a statistical model, or both.

3. The computer-implemented method of claim 1 for predicting QoE performance of an application downloading a webpage over a network, wherein:
  the stat data includes
    connection-level stat data indicating a plurality of different connections, each being between the application and a respective server for the connection, the server being within the server stack, and
    application-level stat data, indicating transfers of webpage content, over respective ones of the different connections, each transfer being from the respective server for the connection to the application; and
  generating the connection-level stat data is based, at least in part, on measurements at the network node.

4. The computer-implemented method of claim 3 for predicting QoE performance of an application downloading a webpage over a network, wherein:
  the application-level stat data includes object-level stat data, and
  generating the object-level stat data includes estimating at least a portion of the object-level stat data, based at least in part on least a portion of the connection-level stat data.

5. The computer-implemented method of claim 3 for predicting QoE performance of an application downloading a webpage over a network, wherein:
  the connection-level stat data indicates, for each of at least a sub-plurality of the connections, a connection start time, a network address of the webpage access application, a network address of the respective server for the connection, and a quantity of webpage content packets that have been communicated over the connection, from the server for the connection to the webpage access application.

6. The computer-implemented method of claim 3 for predicting QoE performance of an application downloading a webpage over a network, wherein:
  determining the stat data corresponding to the traffic through the network node includes detection of Transport Layer Security (TLS) record layer information, the application-level stat data includes object-level stat data, and
generating the object-level stat data is based at least in part on the detection of TLS record layer information.

7. The computer-implemented method of claim 3 for predicting QoE performance of an application downloading a webpage over a network, wherein generating the feature vector includes:
generating a sequence of feature data, by operations that include, over each time interval in a sequence of time intervals, determining a new connection-level stat data or updated connection-level stat data in response to said measurements indicating a respective end of one or more of the connections, a respective start of one or more new ones of the connections, or both, and
generating the feature vector, based at least in part on a concatenating of integer N feature data among the sequence of feature data.

8. The computer-implemented method of claim 7 for predicting QoE performance of an application downloading a webpage over a network, wherein
estimating the download performance metric is based, at least in part, on inputting the feature vector to a machine learning (ML) model, inputting the feature vector to a statistical model, or both, and
outputting the estimated download performance metric based, at least in part, on a result of said inputting the feature vector.

9. The computer-implemented method of claim 7 for predicting QoE performance of an application downloading a webpage over a network, wherein the estimation model is configured to:
estimate whether the feature vector corresponds to page load activity during the time window or to no page load activity during the time window and, based at least in part on a result, output the estimated download performance metric based.

10. The computer-implemented method of claim 7 for predicting QoE performance of an application downloading a webpage over a network, wherein a concatenating of the N time intervals corresponding, respectively, to the N feature data integer forms a time window, and wherein estimating the performance metric includes:
inputting the feature vector to an estimation model,
generating a download activity estimate, based at least in part on a result of an inputting of the feature vector to the estimation model, wherein the download activity estimate indicates whether download activity is estimated to occur or to not occur during the time window, and
generating a value of the estimated download performance metric, based at least in part on the download activity estimate.

11. The computer-implemented method of claim 10 for predicting QoE performance of an application downloading a webpage over a network, wherein estimating the performance metric includes:
generating an updated feature vector, by operations that include sliding the time window at least one of the intervals, and basing the update at least in part on new feature data corresponding to the at least one of the time intervals;
inputting the updated feature vector to the estimation model;
generating a new download activity estimate, based at least in part on a result of the inputting of the updated feature vector to the estimation model, wherein:
the new download activity estimate indicates whether download activity is estimated to occur or to not occur during the slid time window, and
generating the value of the estimated download performance metric is further based, at least in part, on the new download activity estimate.

12. The computer-implemented method of claim 11 for predicting QoE performance of an application downloading a webpage over a network, wherein estimating the performance metric includes:
generating a sequence of new download activity estimates, by operations that include repeating, for an integer number of repetitions:
generating another updated feature vector, by operations that include sliding the time window another at least one of the intervals, and basing the update at least in part on other new feature data corresponding to the another at least one of the time intervals,
inputting the another updated feature vector to the estimation model, and
generating another new download activity estimate, based at least in part on a result of the inputting of the another updated feature vector to the estimation model, and the another new download activity estimate indicates whether download activity is estimated to occur or to not occur during the another slid time window,
wherein generating the value of the estimated download performance metric is further based, at least in part, on the another new download activity estimate.

13. The computer-implemented method of claim 11 for predicting QoE performance of an application downloading a webpage over a network, wherein estimating the performance metric includes:
generating a sequence of new raw download activity estimates, by operations that include repeating, for an integer number of repetitions:
generating another updated feature vector, by operations that include sliding the time window another at least one of the intervals, and basing the update at least in part on other new feature data corresponding to the another at least one of the time intervals,
inputting the another updated feature vector to the estimation model, and
generating another new raw download activity estimate, based at least in part on a result of the inputting of the another updated feature vector to the estimation model, and the another new raw download activity estimate indicates whether download activity is estimated to occur or to not occur during the another slid time window;
applying an error correction process to at least a portion of the sequence of new raw download activity estimates; and
based at least in part on a result of applying the error correction process, generating a sequence of new download activity estimate,
wherein generating the value of the estimated download performance metric is further based, at least in part, on at least a portion of the sequence of new download activity estimates.

14. A system, comprising:
a processor, coupled to a node of an access path between a wide area network (WAN) and an external interface configured to interface with a webpage access device;
a memory, coupled to the processor, storing processor-executable instructions that, when executed by the processor, cause the processor to:

detect transport-layer connections extending through the node, the connections having at least a likelihood of association with a downloading, by a webpage access application associated with the webpage access device, of a webpage hosted by a server stack and, in response, generate connection-level stat data, the connection-level stat data indicating, for each of the connections, a connection start time, a connection end time, a network address for a respective server in the server stack, and a network address for the webpage access application, generate a feature vector, based at least in part on at least a portion of the connection-level stat data, estimate a download performance metric for the webpage access application downloading the webpage from the server stack, based at least in part on at least a portion of the feature vector; and estimate a QoE value, based at least in part on the estimated performance metric.

15. The system of claim 14, wherein the storing processor-executable instructions include processor-executable instructions that, when executed by the processor, cause the processor to:

estimate application-level stat data that indicates a plurality of transfers, or likely transfers, or both, of a plurality of different contents of the webpage, over the transport-layer connections, wherein:

the estimated application-level stat data includes, for each estimated transfer or likely transfer, an identification of the respective server, a time stamp, and an identifier of the webpage content, and generating the feature vector is further based, at least in part, on at least a portion of the estimated application-level stat data.

16. The system of claim 14, wherein the processor-executable instructions include processor-executable instructions that, when executed by the processor, cause the processor to:

implement an estimation model, the estimation model including a machine learning (ML) model, a statistical model, or both, and estimate the download performance metric, further based at least in part on inputting the at least a portion of the feature vector to the estimation model.

17. The system of claim 14, wherein:

the application-level stat data includes object-level stat data that indicates the different contents of the webpage as different webpage objects and indicates, for each of the different webpage objects, an object identifier, the time stamp is a request time stamp, indicating a time of a request sent by the webpage access application, for the object, and the object-level stat date further includes, for each of the different webpage objects, a time of the respective server starting a response to the request.

18. The system of claim 14, wherein the processor-executable instructions include processor-executable instructions that, when executed by the processor, cause the processor to:

detect Transport Layer Security (TLS) record layer information, and estimate the application-level stat data based, at least in part, on the detection of TLS record layer information.

19. A computer-implemented method for predicting quality of experience (QoE) performance of a webpage access application downloading a webpage over a network, comprising:

detecting transport-layer connections extending through a node, the connections having at least a likelihood of association with a downloading, by the webpage access application of the webpage, a server stack and, in response, generating connection-level stat data that indicates, for each of the connections, a connection start time, a connection end time, a network address for a respective server in the server stack, and a network address for the webpage access application;

generating a feature vector, based at least in part on at least a portion of the connection-level stat data;

estimating a download performance metric for the webpage access application downloading the webpage from the server stack, based at least in part on at least a portion of the feature vector; and estimating a QoE value, based at least in part on the estimated performance metric.

* * * * *